(12) United States Patent
Takahashi et al.

(10) Patent No.: US 8,242,643 B2
(45) Date of Patent: Aug. 14, 2012

(54) THREE-STABLE OSCILLATING ELECTROMAGNETIC ACTUATOR

(75) Inventors: Kazuki Takahashi, Tokyo (JP); Takafumi Nakagawa, Tokyo (JP); Mitsuru Tsukima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 227 days.

(21) Appl. No.: 12/745,260

(22) PCT Filed: Jan. 17, 2008

(86) PCT No.: PCT/JP2008/050545
§ 371 (c)(1), (2), (4) Date: May 28, 2010

(87) PCT Pub. No.: WO2009/090744
PCT Pub. Date: Jul. 23, 2009

(65) Prior Publication Data
US 2010/0301686 A1 Dec. 2, 2010

(51) Int. Cl.
*H02K 33/00* (2006.01)
(52) U.S. Cl. .......................... 310/36; 310/39
(58) Field of Classification Search ............... 310/36, 310/39, 15
See application file for complete search history.

(56) References Cited

U.S. PATENT DOCUMENTS

| 3,644,763 | A | * | 2/1972 | Skrobisch | 310/36 |
|---|---|---|---|---|---|
| 3,959,672 | A | * | 5/1976 | Walker et al. | 310/36 |
| 4,857,782 | A | | 8/1989 | Tokio et al. | |
| 4,899,073 | A | * | 2/1990 | Takeuchi et al. | 310/116 |
| 6,518,685 | B2 | * | 2/2003 | Nelson | 310/191 |
| 6,967,422 | B2 | * | 11/2005 | Nelson | 310/191 |
| 7,279,815 | B2 | * | 10/2007 | Lim et al. | 310/36 |

FOREIGN PATENT DOCUMENTS

| JP | 59 144357 | 8/1984 |
|---|---|---|
| JP | 61 16504 | 1/1986 |
| JP | 2001 297912 | 10/2001 |
| JP | 2005 110358 | 4/2005 |

* cited by examiner

*Primary Examiner* — Nguyen N Hanh
(74) *Attorney, Agent, or Firm* — Oblon, Spivak, McClelland, Maier & Neustadt, L.L.P.

(57) ABSTRACT

A three-stable oscillating electromagnetic actuator includes a cylindrical stator from which a plurality of first magnetic poles project toward a center direction, a mover that extends in a circumferential direction inside the stator and is reciprocatingly and rotatably supported along the circumference, and a plurality of coils that are wound around the first magnetic poles and bias the mover to cause it to stop in three positions, which are a first stable position that is on one end side of a rotation range of the mover, a second stable position that is on the other end side, and a neutral position that is an intermediate position. The three-stable oscillating electromagnetic actuator further includes a second magnetic pole made of a magnetic material that abuts against a rotation-direction end of the mover to stop the mover in the first stable position and the second stable position.

10 Claims, 22 Drawing Sheets

SERIES CONNECTION

PARALLEL CONNECTION

200
THREE-STABLE OSCILLATING ELECTROMAGNETIC ACTUATOR

TECHNICAL FIELD

The present invention relates to a three-stable oscillating electromagnetic actuator in which a mover stabilizes in three positions.

BACKGROUND ART

Generally, electromagnetic actuators can generate a strong electromagnetic force with short strokes and are often used for mechanism portions of vacuum circuit breakers. However, in switches or disconnecting switches other than vacuum circuit breakers, electromagnetic actuators that are rotary driven and have long strokes are often used.

In connection with the number of positions where a mover stabilizes, there is a two-stable electromagnetic actuator in which a mover stops in two positions in synchronization with an operation of "ON" and "OFF" of a switch or a disconnecting switch. There is also a three-stable oscillating electromagnetic actuator in which a mover stops in three positions in synchronization with an operation of "ON", "OFF", and "ON" of a switch or a disconnecting switch having two stationary contacts and one moving contact.

For example, Patent Document 1 discloses a two-stable electromagnetic actuator. This actuator is suitable for a contact of a low voltage switch, because this actuator is two-stable actuator and has short strokes. Patent Document 2 discloses a three-stable electromagnetic actuator. This actuator has long strokes. However, because a path of a magnetic flux is mainly in a radial direction, the degree of contribution of the magnetic flux to a rotation driving force is low and thus efficiency thereof is low. Therefore, to apply this actuator to a contact of a large-electric power switch that requires a large driving force, this actuator needs to be made larger.

Patent Document 1: Japanese Patent Application Laid-open No. 2001-297912
Patent Document 2: Japanese Patent Application Laid-open No. S61-16504

DISCLOSURE OF INVENTION

Problem to be Solved by the Invention

In the electromagnetic actuators mentioned above, if a contact of a switch connected to the electromagnetic actuator is for large electric power, to reduce a contact resistance at the time of ON and OFF, a finger contact and a slide contact are used. Therefore, at the "ON" operation, a load at an initial stage of a driving operation is small, and the load is increased at a later stage of the driving operation. Further, at the "OFF" operation, a load is large at the initial stage of the driving operation where the contact is going to be separated, and the load is reduced at the later stage of the driving operation after the contact has been separated. Therefore, there is a problem in that the load largely varies depending on the position of the contact.

Meanwhile, a DC power source and a capacitor are used as a power source of electromagnetic actuators. There is no problem when the DC power source is used; however, when the capacitor is used, a current is large at an initial stage of a driving operation and the current is reduced at a later stage of the driving operation because of pulse discharge. A proportional relation is established between a current and a magnetic flux that contributes to an electromagnetic force. Therefore, when the capacitor is used, there is a problem in that the current becomes small at the later stage of the driving operation at both "ON" and "OFF" operations of a switch, and the electromagnetic force becomes small.

The "OFF" operation of the switch shows an electromagnetic force curve, which is suitable for a load curve in which the current is large at the initial stage of the driving operation where the load is large, and the current becomes small at the later stage of the driving operation where the load is small. However, at the "ON" operation, the current is large at the initial stage of the driving operation where the load is small, and the current becomes small at the later stage of the driving operation where the load is large. To obtain a large current at the later stage of the driving operation where the load is large, a capacitor having a large capacity needs to be used. Therefore, it is necessary to enhance the efficiency to obtain a large torque with a small current at the later stage of the driving operation of the "ON" operation.

The present invention has been achieved in view of the above, and an object of the present invention is to provide a three-stable oscillating electromagnetic actuator that can reduce the size and power consumption thereof by efficiently converting a magnetic flux into a torque, and that can reliably stop a mover in a stable position.

Means For Solving Problem

To solve the problem described above and achieve the object, a three-stable oscillating electromagnetic actuator according to the present invention includes a cylindrical stator from which a plurality of first magnetic poles project toward a center direction; a mover that extends in a circumferential direction inside the stator and is reciprocatingly and rotatably supported along the circumference; and a plurality of coils that are wound around the first magnetic poles and bias the mover to cause it to stop in three positions, which are a first stable position that is on one end side of a rotation range of the mover, a second stable position that is on the other end side, and a neutral third position that is an intermediate position, wherein the three-stable oscillating electromagnetic actuator further includes a second magnetic pole that is made of a magnetic material and abuts against a rotation-direction end of the mover to stop the mover in the first stable position and the second stable position.

Effect of the Invention

According to the present invention, the actuator has a second magnetic pole that is made of a magnetic material and operates as a magnetic pole, that abuts against a rotation-direction end of a mover to stop the mover. Therefore, the actuator efficiently converts a magnetic flux into a torque, the actuator can reduce the size and power consumption thereof, and the actuator reliably stops the mover in a stable position.

Figure 1:
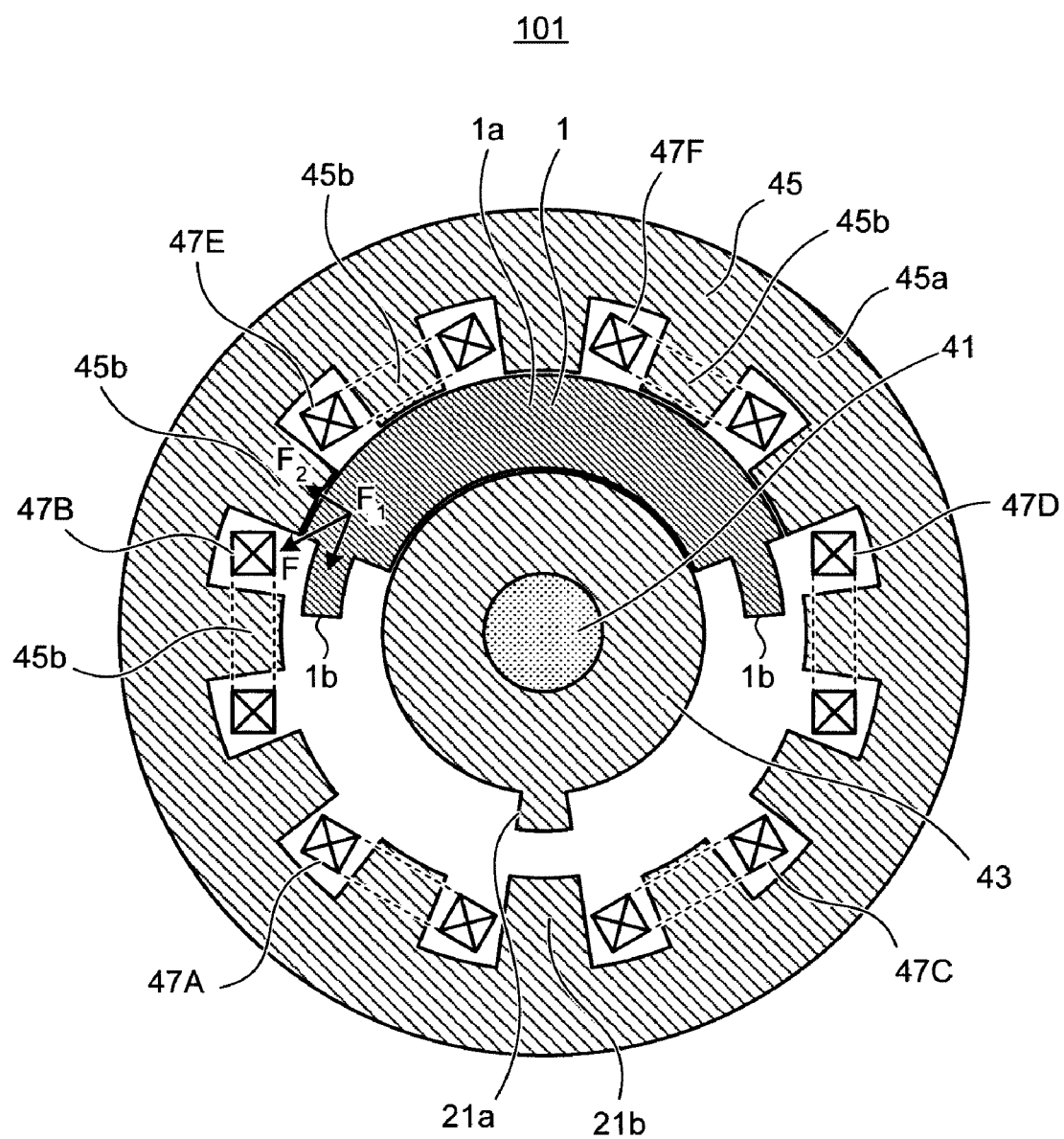
FIG. 1 is a cross-sectional view of a state where magnetic fluxes are generated at an initial stage of a driving operation from a neutral position to a first stable position, in a three-stable oscillating electromagnetic actuator according to a first embodiment of the present invention.

EXPLANATIONS OF LETTERS OR NUMERALS 1, 2, 3, 11, 12, 13 Mover
1a, 3a, 4a, 11a, 12a, 13a Main unit
1b, 3b, 4b, 11b, 12b, 13b Engaging convex portion
21a, 21b, 22, 23, 24, 33 Stopper (second magnetic pole)
26, 30 Magnetic material
26a, 30a Large-diameter portion
26b, 30b Small-diameter portion
26c, 30c Radial portion
25, 27, 43 Center member
30d Radial portion having large area
35 Solenoid device
35a Plunger
35b Driving coil
41 Rotation shaft
45 Stator
45a Main unit
45b Magnetic pole (first magnetic pole)
47A, 47B, 47C, 47D, 47E, 47F Coil
47G, 47H Coil (second coil)
49 First permanent magnet
51, 53 Second permanent magnet
55 Third permanent magnet
101 to 116 Three-stable oscillating electromagnetic actuator

BEST MODE(S) FOR CARRYING OUT THE INVENTION

Exemplary embodiments of a three-stable oscillating electromagnetic actuator according to the present invention will be explained below in detail with reference to the accompanying drawings. The present invention is not limited to the embodiments.

First Embodiment

Figure 2:
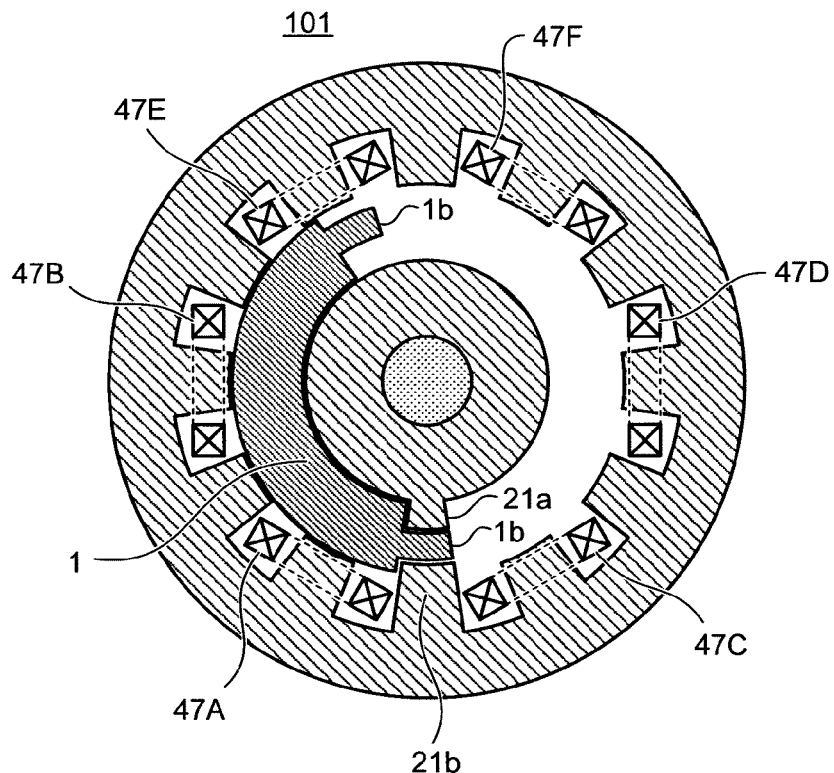
FIG. 2 is a cross-sectional view of a state where a mover is in the first stable position.
Figure 3:
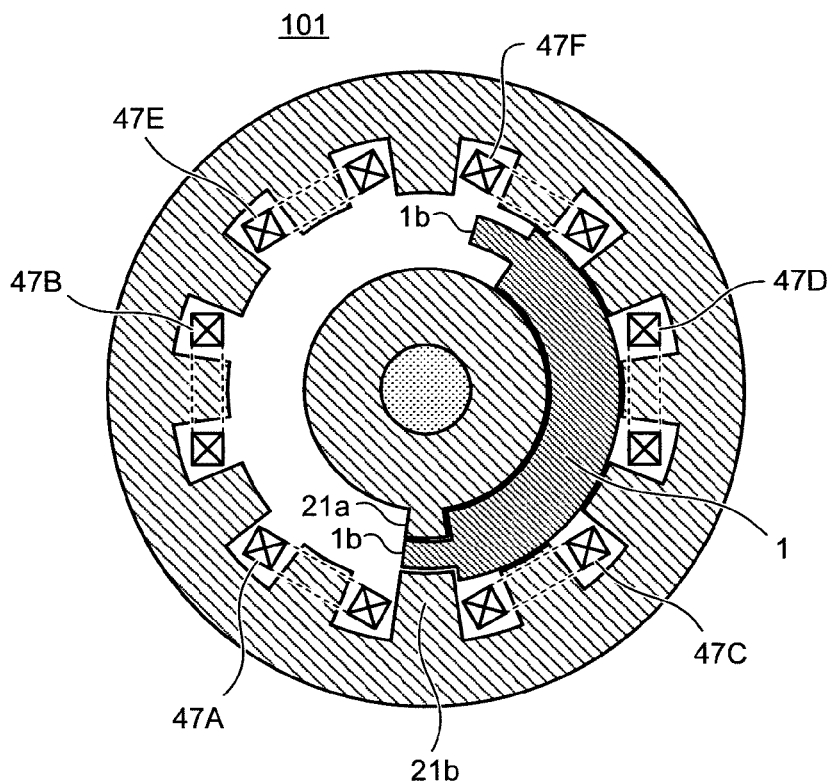
FIG. 3 is a cross-sectional view of a state where the mover is in the second stable position.

FIG. 1 is a cross-sectional view of a three-stable oscillating electromagnetic actuator according to a first embodiment of the present invention, and depicts a state where a mover is in a neutral position. FIG. 2 is a cross-sectional view of a state where the mover is in a first stable position. FIG. 3 is a cross-sectional view of a state where the mover is in a second stable position. As shown in FIG. 1, a three-stable oscillating electromagnetic actuator 101 includes a center member 43 provided around a rotation shaft 41; a stator 45 coaxially provided around the center member 43 at a predetermined distance and from which plural teeth (first magnetic poles) 45b project toward a center direction; and a mover 1 that is arranged in a cylindrical space formed between the center member 43 and the stator 45, extends in a circumferential direction, and is supported to be capable of reciprocatingly rotating in the circumferential direction. The three-stable oscillating electromagnetic actuator 101 also includes a plurality of coils 47A, 47B, 47C, 47D, 47E, and 47F that are wound around the first magnetic poles 45b and bias the mover 1 to three positions, i.e., a first stable position, a second stable position, and a neutral position; and stoppers 21a and 21b that abut against rotation-direction ends of the mover 1 in the first stable position and the second stable position to stop the mover 1 and form second magnetic poles made of a magnetic material.

The center member 43 is made of a magnetic material, and is formed in a substantially short cylindrical shape. A projection 21a forming one of the second magnetic poles is formed at a predetermined position on an outer peripheral surface of the center member 43. The stator 45 is made of a magnetic material and arranged to surround the center member 43. The stator 45 includes a substantially short cylindrical yoke 45a, and the plural teeth (first magnetic poles) projecting from an inner periphery of the yoke 45a toward a center direction. A projection 21b forming the other second magnetic pole is formed at a position opposed to the projection 21a provided on the center member 43.

Left-rotation coils 47A and 47B, right-rotation coils 47C and 47D, and neutral-position-stable coils 47E and 47F are wound around the plural first magnetic poles 45b formed on the stator 45 along a circumference thereof at equal distances from one another.

The mover 1 has substantially an arc cross section, extends along the circumferential direction, and is supported by a support member (not shown) such that the mover 1 can rotate from a rotation center, and rotates in a reciprocating manner between the first stable position and the second stable position. The mover 1 includes a main unit 1a having an arc cross section, and engaging convex portions 1b and 1b formed on both ends of the main unit 1a in its rotation direction. The engaging convex portions 1b and 1b are formed at locations shifted from a center of the end of the main unit 1a in its radial direction by a predetermined amount toward the coil (towards an outer diameter side). The engaging convex portions 1b and 1b have such shapes that the engaging convex portions 1b and 1b are fitted into a gap formed between the stoppers (second magnetic poles) 21a and 21b. That is, the gap formed between the stoppers 21a and 21b forms the engaging concave portion that engages with the engaging convex portions 1b and 1b. When the mover 1 moves to the first stable position or the second stable position, one of the engaging convex portions 1b is inserted into the gap formed between the stoppers 21a and 21b, the end of the mover 1 is abutted against the stoppers 21a and 21b and movement of the mover 1 is limited.

An operation is described. When the mover 1 is driven from the neutral position shown in FIG. 1 to the first stable position shown in FIG. 2, a magnetic flux is formed between the mover 1 and the stator 45 if a current is applied to the coils 47A and 47B. The mover 1 is driven in a counterclockwise direction around the rotation shaft 41 as a rotation center. When the mover 1 reaches the first stable position shown in FIG. 2, the current application to the coils 47A and 47B is stopped.

When the mover 1 is driven from the first stable position shown in FIG. 2 to the neutral position shown in FIG. 1, a magnetic flux is formed between the mover 1 and the stator 45 if a current is applied to the coils 47E and 47F, and the mover 1 is driven in a clockwise direction around the rotation shaft 41 as a rotation center. When the mover 1 reaches the neutral position shown in FIG. 1, the current application to the coils 47E and 47F is stopped.

Because the structure is bilaterally symmetric, explanations of other operations are omitted; however, by switching the coils to which a current is applied as described above, the mover 1 can reciprocate between the neutral position shown in FIG. 1, the first stable position shown in FIG. 2, and the second stable position shown in FIG. 3.

When the mover 1 is driven from the neutral position shown in FIG. 1 to the first stable position shown in FIG. 2, the mover 1 is attracted by the coil 47B at an initial stage of a driving operation and the mover 1 is attracted by the coil 47A at a later stage of the driving operation. Other operations are also the same. By attracting the mover 1 while switching between the coils to which a current is applied in this manner, a strong electromagnetic force can be generated even when a moving distance is long.

Figure 4:
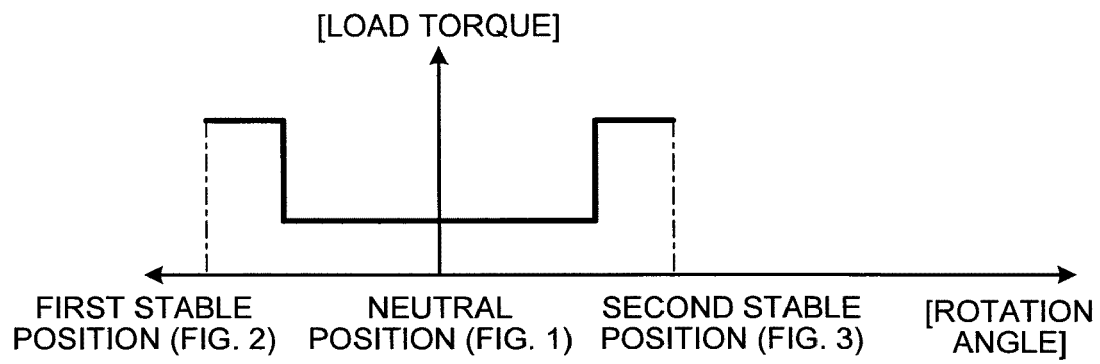
FIG. 4 depicts a load curve of a contact of a switch connected to the three-stable oscillating electromagnetic actuator.

Next, a load curve of a contact of a switch (not shown) connected to the three-stable oscillating electromagnetic actuator 101 is shown in FIG. 4. When the mover 1 is driven from the neutral position shown in FIG. 1 to the first stable position shown in FIG. 2, the load is small at the initial stage of the driving operation and the load becomes large at the later stage of the driving operation. When the mover 1 is driven from the first stable position shown in FIG. 2 to the neutral position shown in FIG. 1, the load is large at the initial stage of the driving operation and the load becomes small at the later stage of the driving operation. The same phenomenon appears also when the mover 1 is driven to the second stable position shown in FIG. 3.

In the electromagnetic actuator 101 of the present embodiment, the coils 47A, 47B, 47C, 47D, 47E, and 47F are arranged on the circumference of the stator 45. Therefore, magnetic fluxes generated from the coil pass through the mover 1 and flow in a radial direction (an arrow F2 in FIG. 1) and a tangent direction (an arrow F1 in FIG. 1). A force in the tangent direction is required when obtaining a rotation driving force of the mover 1. A magnetic flux that passes through the mover 1 in the tangent direction contributes as a rotation driving force; however, a magnetic flux that passes through the mover 1 in the radial direction does not contribute to the rotation driving force. Thus, the electromagnetic actuator 101 according to the present embodiment is provided with the stoppers 21*a* and 21*b* forming the second magnetic poles that abut against the rotation-direction ends of the mover 1 in the first stable position and the second stable position and stop the mover 1. The engaging convex portions 1*b* and 1*b* are provided on both ends of the mover 1 in the rotation direction.

Figure 5:
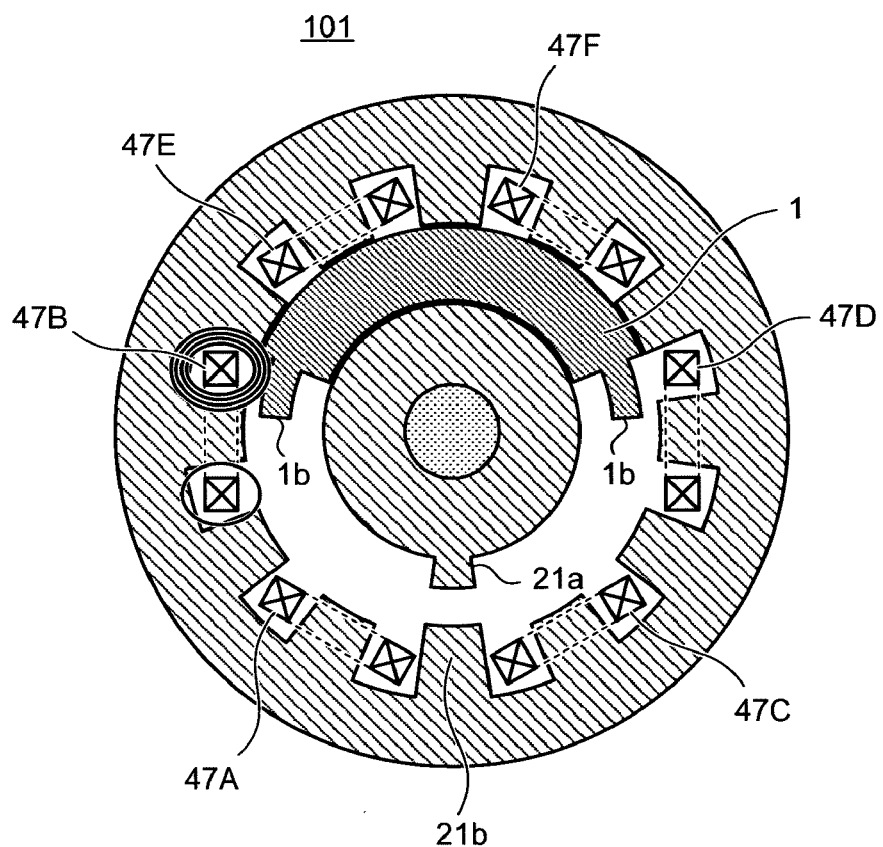
FIG. 5 is a cross-sectional view of a state where magnetic fluxes are generated at an initial stage of a driving operation from the neutral position to the first stable position.
Figure 6:
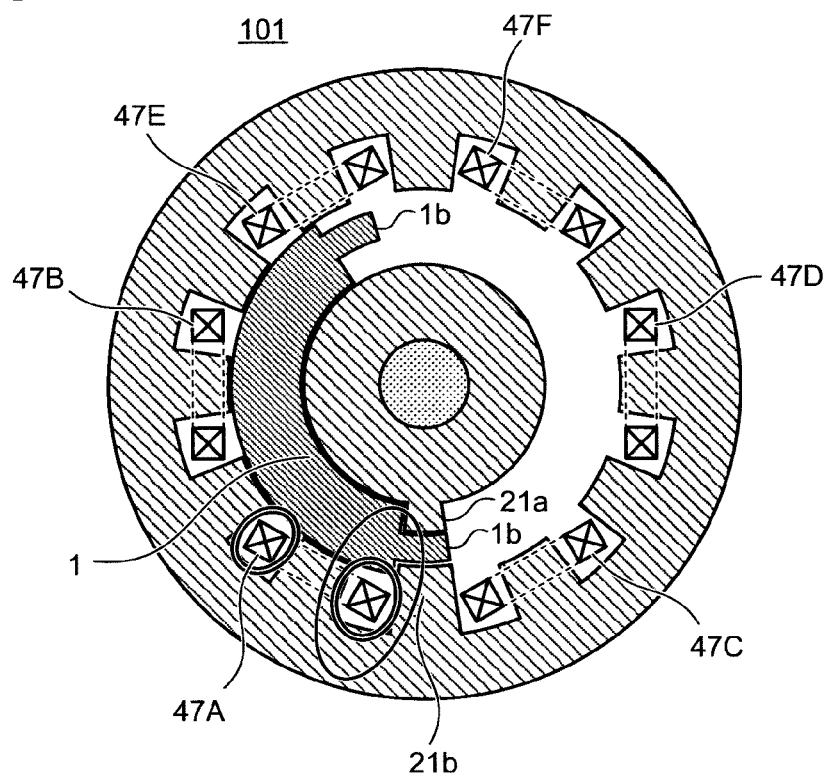
FIG. 6 is a cross-sectional view of a state where magnetic fluxes are generated at a later stage of a driving operation from the neutral position to the first stable position.
Figure 7:
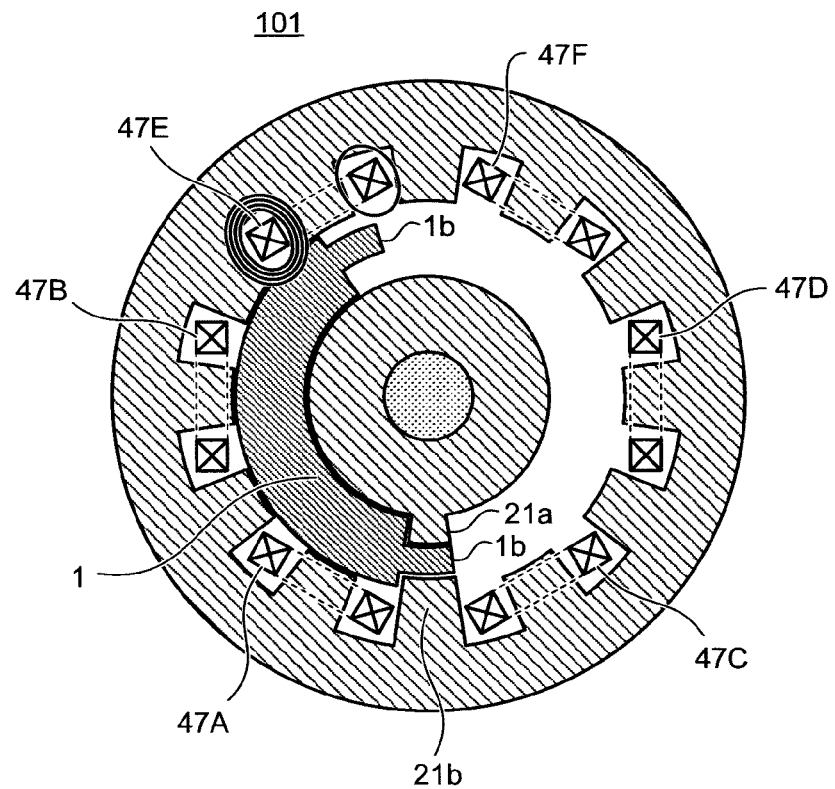
FIG. 7 is a cross-sectional view of a state where magnetic fluxes are generated at an initial stage of a driving operation from the first stable position to the neutral position.
Figure 8:
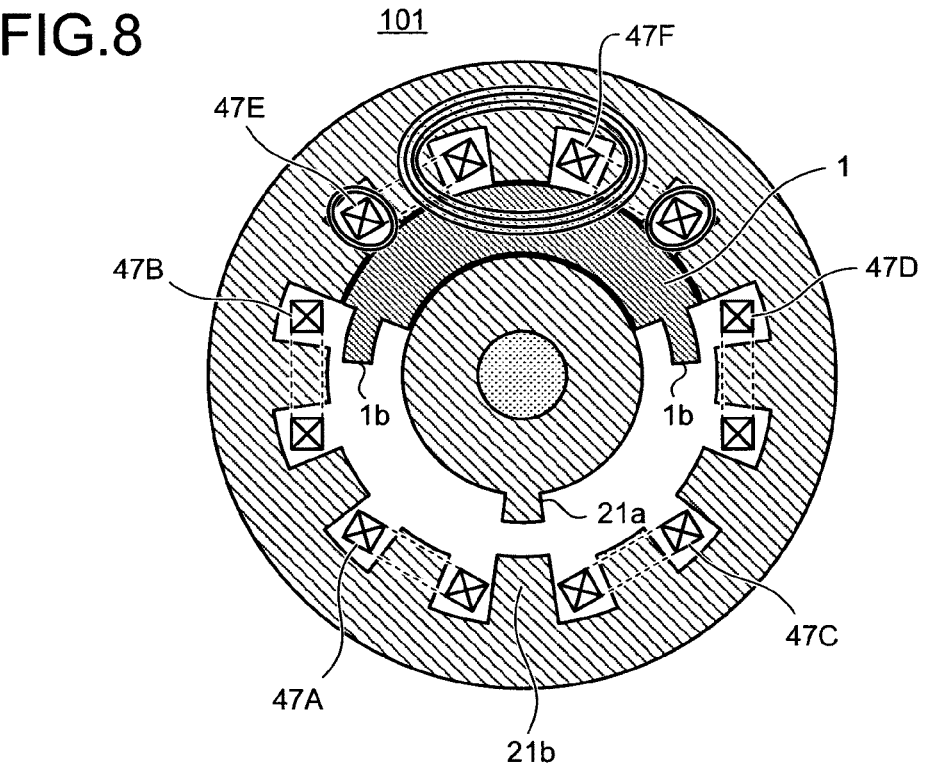
FIG. 8 is a cross-sectional view of a state where magnetic fluxes are generated at a later stage of a driving operation from the first stable position to the neutral position.

FIG. 5 is a cross-sectional view of a state where magnetic fluxes are generated at the initial stage of the driving operation from the neutral position to the first stable position. More magnetic fluxes generated on one side of the coil 47B are applied in the tangent direction due to effect of the engaging convex portion 1*b* of the mover 1. FIG. 6 is a cross-sectional view of a state where magnetic fluxes are generated at the later stage of the driving operation from the neutral position to the first stable position. More magnetic fluxes generated on one side of the coil 47A provided in the first stable position are applied in the tangent direction due to effect of the stoppers (second magnetic poles) 21*a* and 21*b* and the engaging convex portion 1*b*. FIG. 7 is a cross-sectional view of a state where magnetic fluxes are generated at the initial stage of the driving operation from the first stable position to the neutral position. More magnetic fluxes generated on one side of the coil 47E are applied in the tangent direction due to effect of the engaging convex portion 1*b*. FIG. 8 is a cross-sectional view of a state where magnetic fluxes are generated at the later stage of the driving operation from the first stable position to the neutral position. More magnetic fluxes generated on the coils 47E and 47F are applied in the tangent direction like in a conventional technique.

As described above, a magnetic flux that passes through the mover 1 in the tangent direction becomes a rotation driving force, and a magnetic flux that passes through the mover 1 in the radial direction does not become the rotation driving force. Therefore, the electromagnetic actuator 101 according to the present embodiment is provided with the stoppers 21*a* and 21*b* forming the second magnetic poles that abut against the rotation-direction ends of the mover 1 in the first stable position and the second stable position and stop the mover 1. The engaging convex portions 1*b* and 1*b* are provided on both ends of the mover 1 in the rotation direction. With this arrangement, as shown in FIGS. 5 to 8, at the later stage of the driving operation, less magnetic flux flows in the radial direction, and more magnetic flux flows in the tangent direction, and a large rate of magnetic flux can contribute to the rotation driving force, and a high torque can be obtained. By efficiently converting a magnetic flux into a torque, the electromagnetic actuator 101 can reduce the size and power consumption thereof.

Second Embodiment

Figure 9:
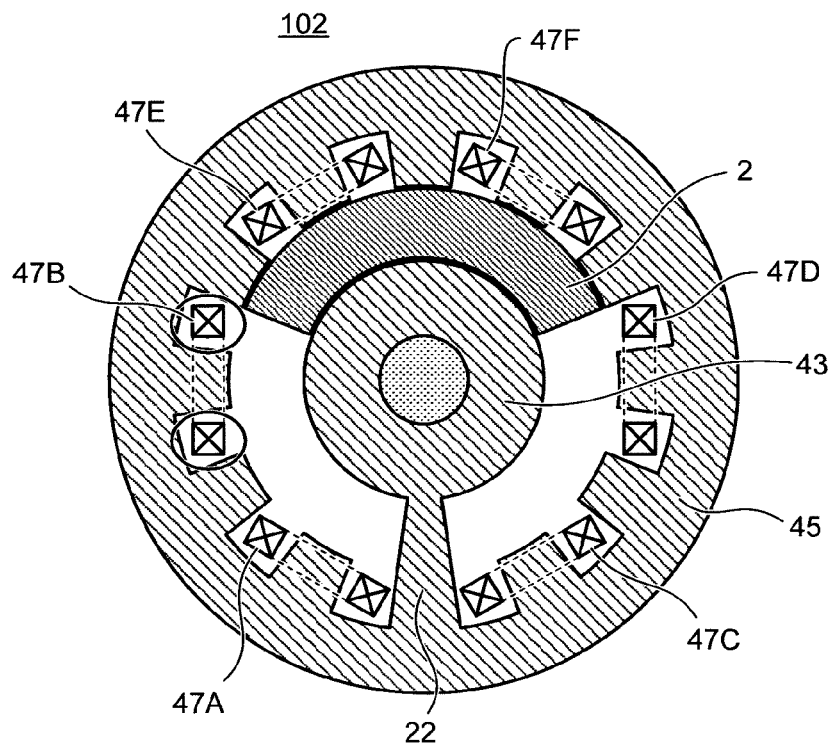
FIG. 9 is a cross-sectional view of a state where magnetic fluxes are generated at an initial stage of a driving operation from a neutral position to a first stable position, in a three-stable oscillating electromagnetic actuator according to a second embodiment of the present invention.

FIG. 9 is a cross-sectional view of a three-stable oscillating electromagnetic actuator according to a second embodiment of the present invention, and is a cross-sectional view of a state where magnetic fluxes are generated at an initial stage of a driving operation from a neutral position to a first stable position. As shown FIG. 9, in a three-stable oscillating electromagnetic actuator 102 according to the present embodiment, a mover 2 is not provided at its end with an engaging convex portion. Corresponding to this configuration, a stopper made of a magnetic material that operates as a second magnetic pole is continuously formed from the center member 43 to the stator 45 without interruption. Other configurations of the second embodiment are the same as those of the first embodiment.

Figure 10:
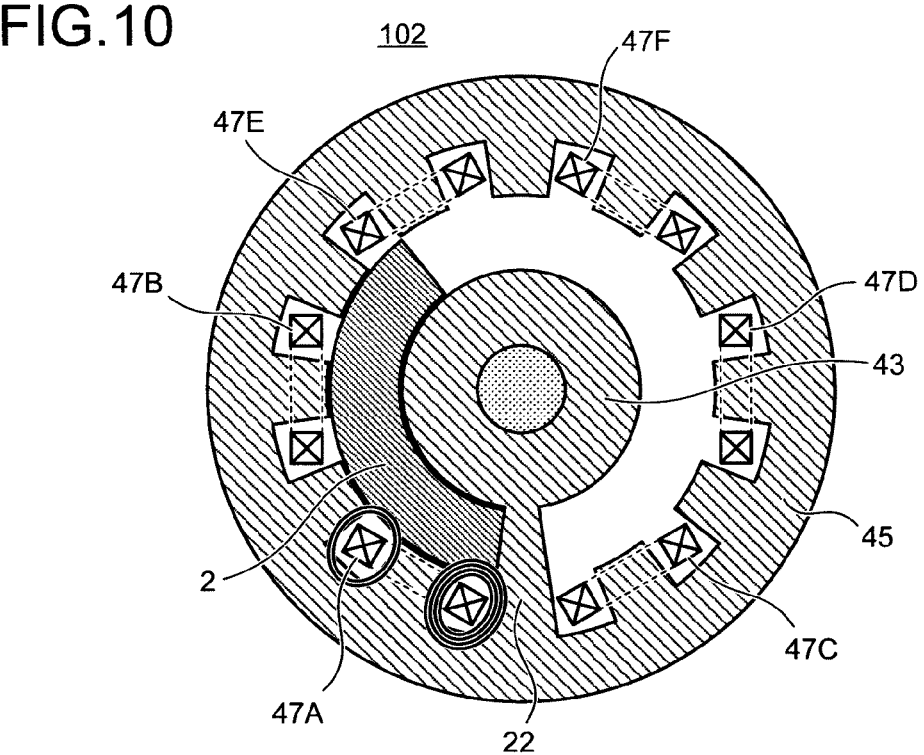
FIG. 10 is a cross-sectional view of a state where magnetic fluxes are generated at a later stage of a driving operation from the neutral position to the first stable position.
Figure 11:
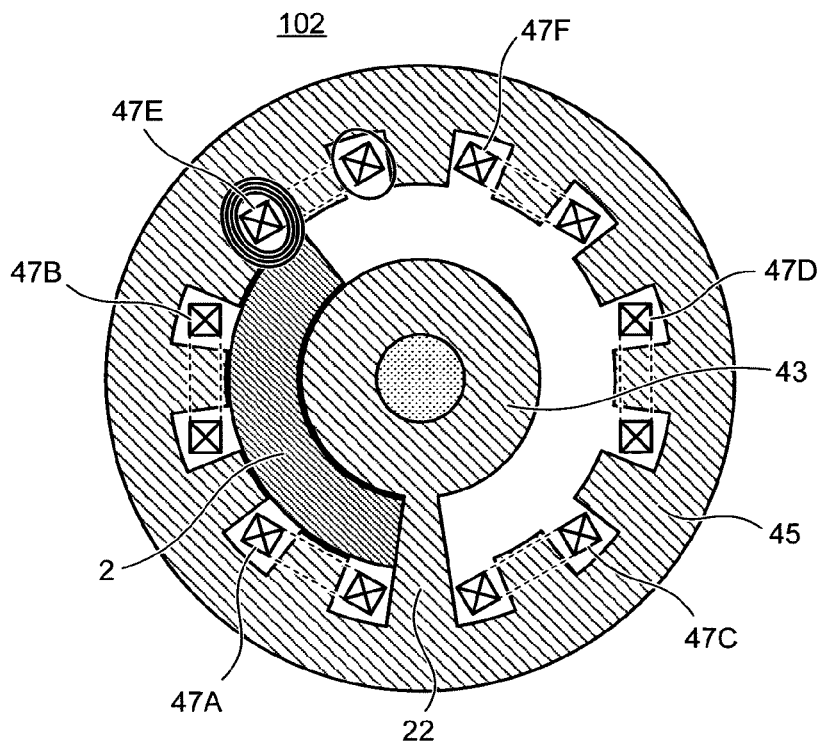
FIG. 11 is a cross-sectional view of a state where magnetic fluxes are generated at an initial stage of a driving operation from the first stable position to the neutral position.
Figure 12:
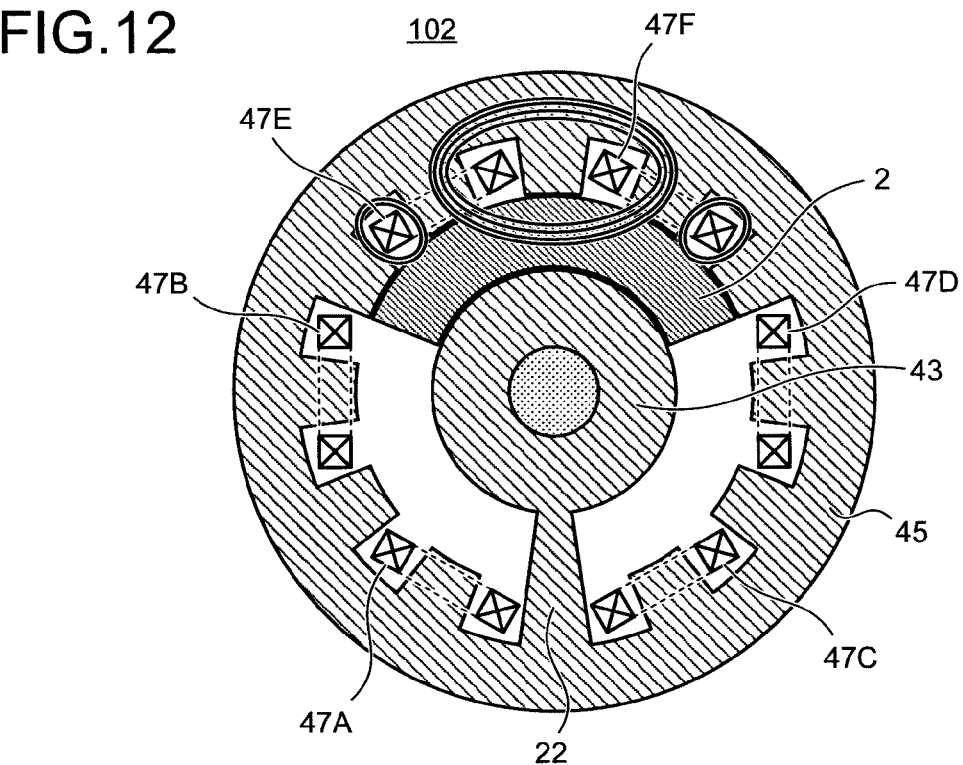
FIG. 12 is a cross-sectional view of a state where magnetic fluxes are generated at a later stage of a driving operation from the first stable position to the neutral position.

FIG. 10 is a cross-sectional view of a state where magnetic fluxes are generated at a later stage of the driving operation from the neutral position to the first stable position. FIG. 11 is a cross-sectional view of a state where magnetic fluxes are generated at the initial stage of the driving operation from the first stable position to the neutral position. FIG. 12 is a cross-sectional view of a state where magnetic fluxes are generated at the later stage of the driving operation from the first stable position to the neutral position. In FIG. 9, because a gap between the mover 2 and a magnetic pole of the coil 47B is large at the initial stage of the driving operation from the neutral position to the first stable position, an electromagnetic force generated in the coil 47B is small.

In FIG. 10, because an end surface of the mover 2 in a rotation direction and a stopper (a second magnetic pole) 22 abut against each other at the later stage of the driving operation from the neutral position to the first stable position, a generated electromagnetic force is large. In FIGS. 11 and 12, in the driving operation from the first stable position to the neutral position, the position of the magnetic pole is the same as that in the first embodiment at both the initial stage and the later stage, and thus the same electromagnetic force is obtained.

Third Embodiment

Figure 13:
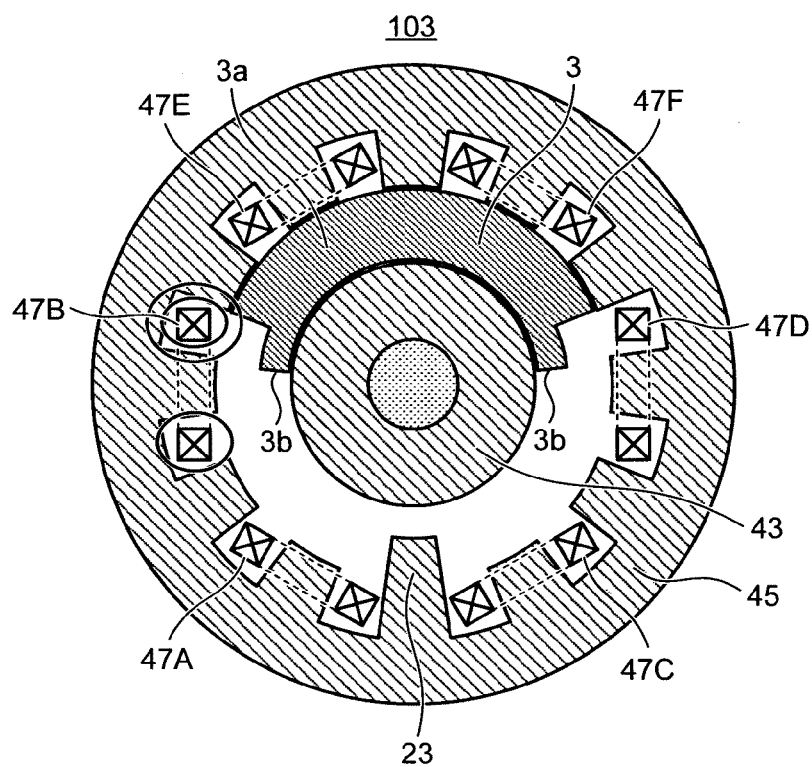
FIG. 13 is a cross-sectional view of a state where magnetic fluxes are generated at an initial stage of a driving operation from a neutral position to a first stable position, in a three-stable oscillating electromagnetic actuator according to a third embodiment of the present invention.

FIG. 13 is a cross-sectional view of a state of a three-stable oscillating electromagnetic actuator according to a third embodiment of the present invention, and is a cross-sectional view of a state where magnetic fluxes are generated at a initial stage of a driving operation from a neutral position to a first stable position. As shown in FIG. 13, in a three-stable oscillating electromagnetic actuator 103 according to the present embodiment, a mover 3 includes a main unit 3*a* having an arc cross section, and engaging convex portions 3*b* and 3*b* formed on both ends of the main unit 3*a* in a rotation direction. The engaging convex portions 3*b* and 3*b* project from innermost-diameter sides of the ends of the main unit 3*a*. Corresponding to this configuration, a stopper 23 made of a magnetic material that operates as a second magnetic pole is formed as a projection upright from the stator 45 toward a center member 43. Other configurations of the third embodiment are the same as those of the first embodiment.

Figure 14:
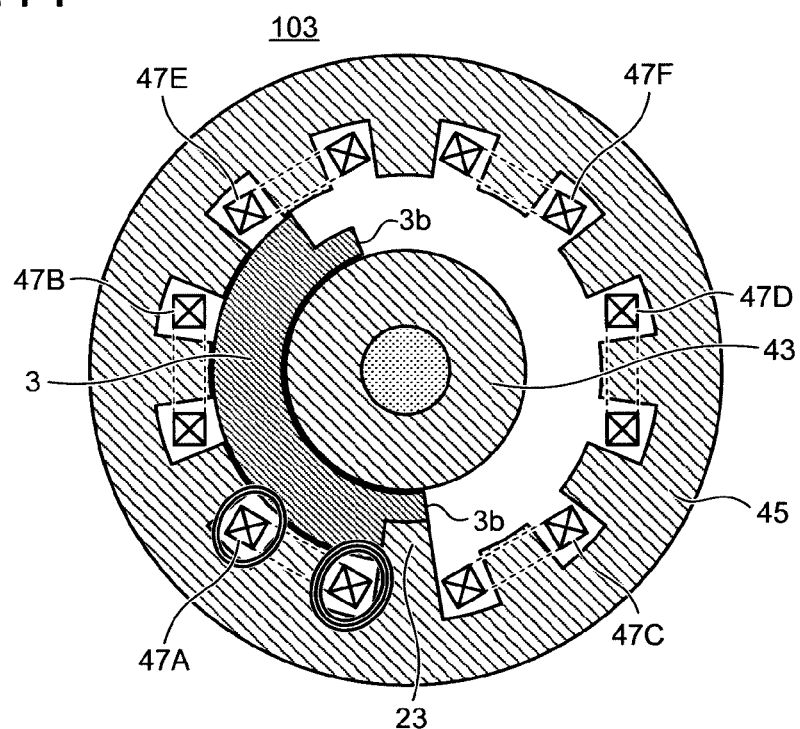
FIG. 14 is a cross-sectional view of a state where magnetic fluxes are generated at a later stage of a driving operation from the neutral position to the first stable position.
Figure 15:
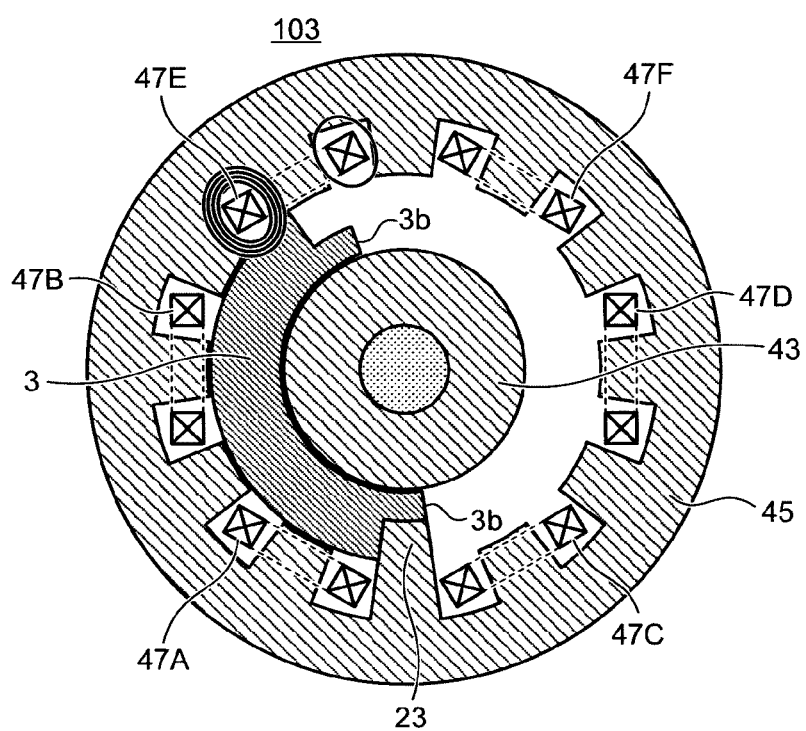
FIG. 15 is a cross-sectional view of a state where magnetic fluxes are generated at an initial stage of a driving operation from the first stable position to the neutral position.
Figure 16:
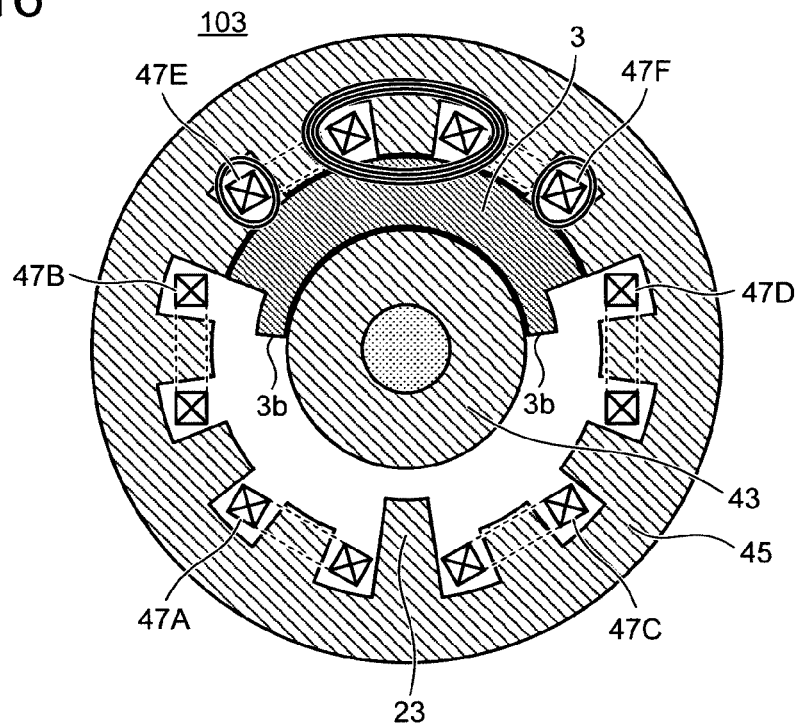
FIG. 16 is a cross-sectional view of a state where magnetic fluxes are generated at a later stage of a driving operation from the first stable position to the neutral position.

FIG. 14 is a cross-sectional view of a state where magnetic fluxes are generated at a later stage of the driving operation from the neutral position to the first stable position. FIG. 15 is a cross-sectional view of a state where magnetic fluxes are generated at the initial stage of the driving operation from the first stable position to the neutral position. FIG. 16 is a cross-sectional view of a state where magnetic fluxes are generated at the later stage of the driving operation from the first stable position to the neutral position. In FIG. 13, at the initial stage of the driving operation from the neutral position to the first stable position, because the engaging convex portion 3b that operates as the magnetic pole projects, more magnetic fluxes pass through the mover 3 as compared with the second embodiment, and the generated electromagnetic force is increased. In FIG. 14, at the later stage of the driving operation from the neutral position to the first stable position, because an end surface of the engaging convex portion 3b of the mover 3 does not abut against the stopper 23 forming the magnetic pole, an electromagnetic force to be generated is reduced as compared with that of the second embodiment. In FIGS. 15 and 16, in the driving operation from the first stable position to the neutral position, the engaging convex portions 3b and 3b formed at the innermost-diameter sides of the ends of the main unit 3a do not influence almost at all, there is no large difference between the generated electromagnetic force in the third embodiment and that in the second embodiment.

Fourth Embodiment

Figure 17:
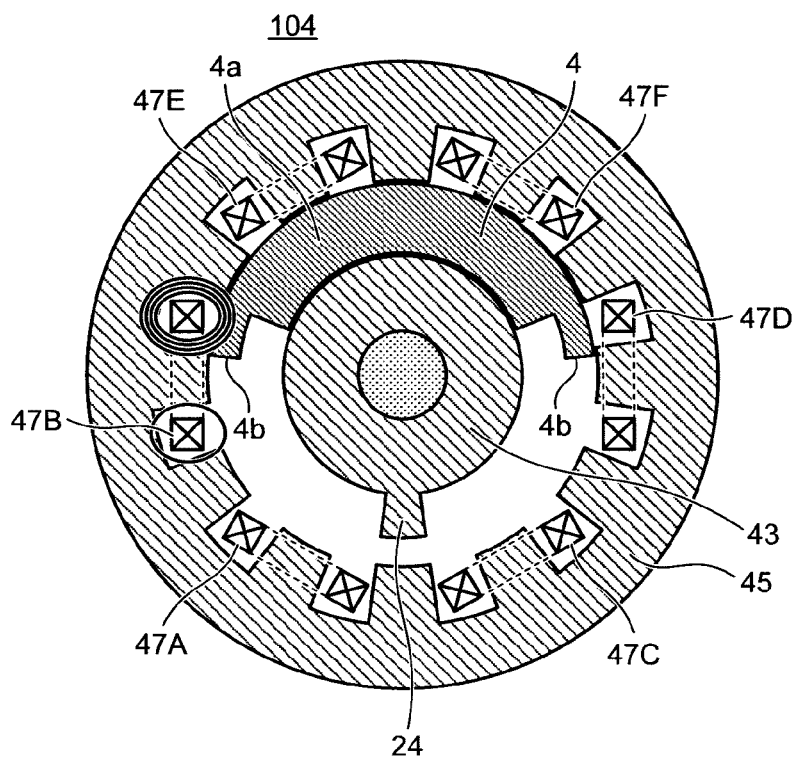
FIG. 17 is a cross-sectional view of a three-stable oscillating electromagnetic actuator according to a fourth embodiment of the present invention, and is a cross-sectional view of a state where magnetic fluxes are generated at an initial stage of a driving operation from a neutral position to a first stable position.

FIG. 17 is a cross-sectional view of a three-stable oscillating electromagnetic actuator according to a fourth embodiment of the present invention, and is a cross-sectional view of a state where magnetic fluxes are generated at an initial stage of a driving operation from a neutral position to a first stable position. As shown in FIG. 17, in a three-stable oscillating electromagnetic actuator 104 according to the present embodiment, a mover 4 includes a main unit 4a having an arc cross section, and engaging convex portions 4b and 4b formed on both ends of the main unit 4a in its rotation direction. The engaging convex portions 4b and 4b project from outermost-diameter sides of the ends of the main unit 4a. Corresponding to this configuration, a stopper 24 made of a magnetic material that operates as a second magnetic pole is formed as a projection upright in a direction of the center member 43. Other configurations of the fourth embodiment are the same as those of the first embodiment.

Figure 18:
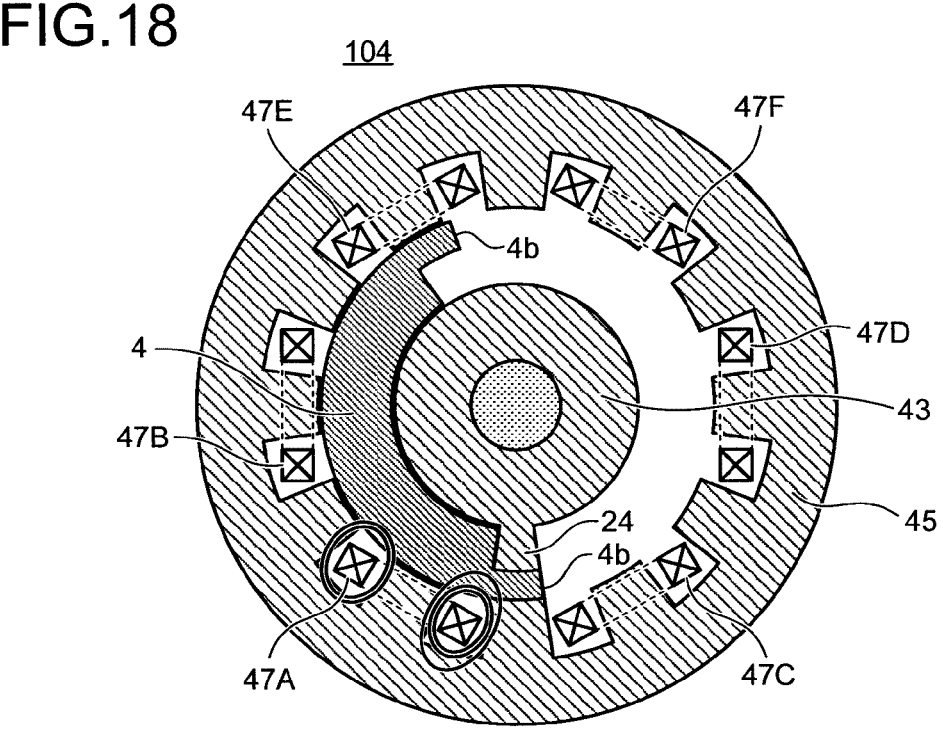
FIG. 18 is a cross-sectional view of a state where magnetic fluxes are generated at a later stage of a driving operation from the neutral position to the first stable position.
Figure 19:
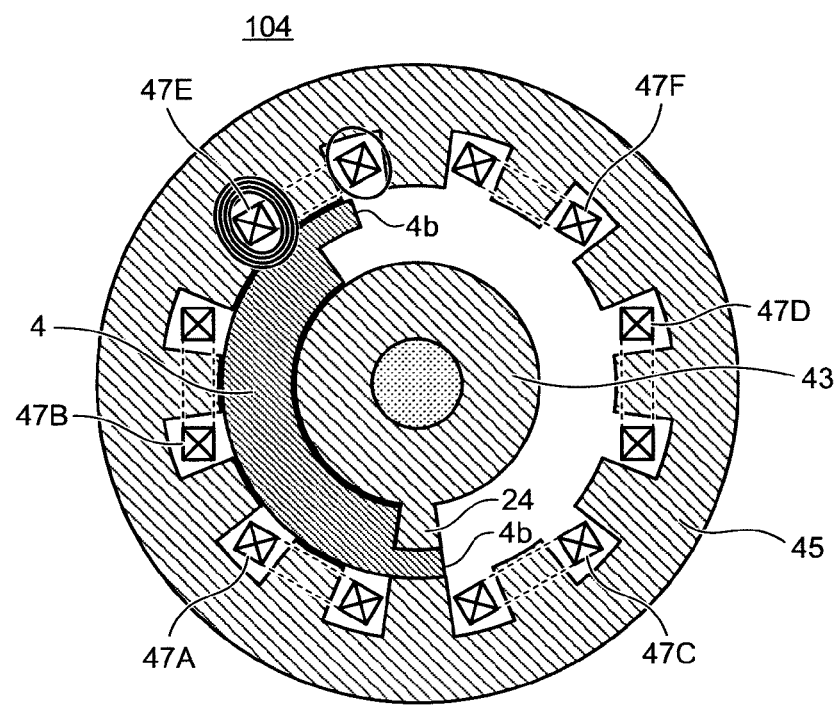
FIG. 19 is a cross-sectional view of a state where magnetic fluxes are generated at an initial stage of a driving operation from the first stable position to the neutral position.
Figure 20:
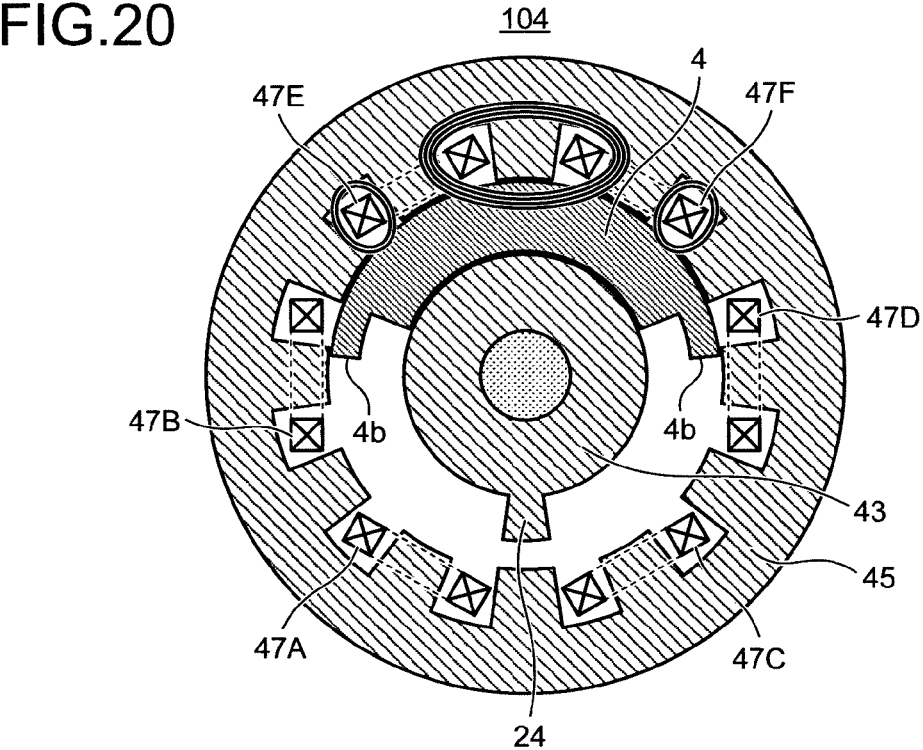
FIG. 20 is a cross-sectional view of a state where magnetic fluxes are generated at a later stage of a driving operation from the first stable position to the neutral position.

FIG. 18 is a cross-sectional view of a state where magnetic fluxes are generated at a later stage of the driving operation from the neutral position to the first stable position. FIG. 19 is a cross-sectional view of a state where magnetic fluxes are generated at the initial stage of the driving operation from the first stable position to the neutral position. FIG. 20 is a cross-sectional view of a state where magnetic fluxes are generated at the later stage of the driving operation from the first stable position to the neutral position. In FIG. 17, at the initial stage of the driving operation from the neutral position to the first stable position, because a gap between the magnetic pole of the mover 1 and the magnetic pole of the coil 47B is short, an electromagnetic force is increased. In FIG. 18, at the later stage of the driving operation from the neutral position to the first stable position, an end surface of the mover 4 from which the engaging convex portion 4b project does not abut against the stopper 24 that operates as the magnetic pole, the electromagnetic force is reduced as compared with that of the second embodiment. In FIG. 19, at the initial stage of the driving operation from the first stable position to the neutral position, because the magnetic pole of the coil 47E and the magnetic pole of the mover 4 are opposed to each other in a surface-surface relation, a radial direction of a path of the magnetic flux becomes a main component, a total amount of magnetic fluxes is greater than that of the second embodiment, the rate of contribution to the rotation driving force is low. In FIG. 20, at the initial stage of the driving operation from the first stable position to the neutral position, there is no large difference between the generated electromagnetic force in the fourth embodiment and that in the first embodiment.

| | To first stable position | | Return to neutral position | |
|---|---|---|---|---|
| | Initial stage | Later stage | Initial stage | Later stage |
| Actuator 101 (First embodiment) | ○ | ○ | ○ | ○ |
| Actuator 102 (Second embodiment) | x | ○○ | ○ | ○ |
| Actuator 103 (Third embodiment) | x | ○ | ○ | ○ |
| Actuator 104 (Fourth embodiment) | ○○ | ○ | Δ | ○ |

The above table shows the magnitude of electromagnetic forces (torques) at the initial stage of the driving operation and later stage of a driving operation of an action to move from the neutral position to the first stable position and an action to return from the first stable position to the neutral position in the actuators 101 to 104 of the first to fourth embodiments. In the table, the double circle represents very strong, ○ represents strong, Δ represents weak, and x represents very weak. It can be understood that in the case of the actuator 102 and the actuator 103, the magnitude of the electromagnetic force (torque) is small at the initial stage of the driving operation of the action to move from the neutral position to the first stable position, and the magnitude of the electromagnetic force (torque) is large at the later stage of the driving operation, and this corresponds to a load curve of the contact of the switch shown in FIG. 4. However, the magnitude of electromagnetic forces (torques) at the initial stage of the driving operation to the first stable position of the actuator 102 and the actuator 103 is considerably small. To start moving the mover that is at a stop, an electromagnetic force (torque) that overcomes loads of an inertial force caused by a weight of the mover, static friction and a contact is required. However, the electromagnetic forces (torques) at the initial stage of the driving operation to the first stable position of the actuator 102 and the actuator 103 are small and unsuitable.

In contrast, an electromagnetic force of the actuator 104 at the initial stage of the driving operation of the action to move from the neutral position to the first stable position is very strong. However, a torque at the initial stage of the driving operation of the action to return from the first stable position to the neutral position is small. That is, the actuator 102 and the actuator 103 are excellent in electromagnetic force characteristics of the action to return from the first stable position to the neutral position, and the actuator 104 is excellent in electromagnetic force characteristics of the action to move from the neutral position to the first stable position. Due to these characteristics, the actuator 101 has a combined shape of both of the actuators.

Fifth Embodiment

Figure 21:
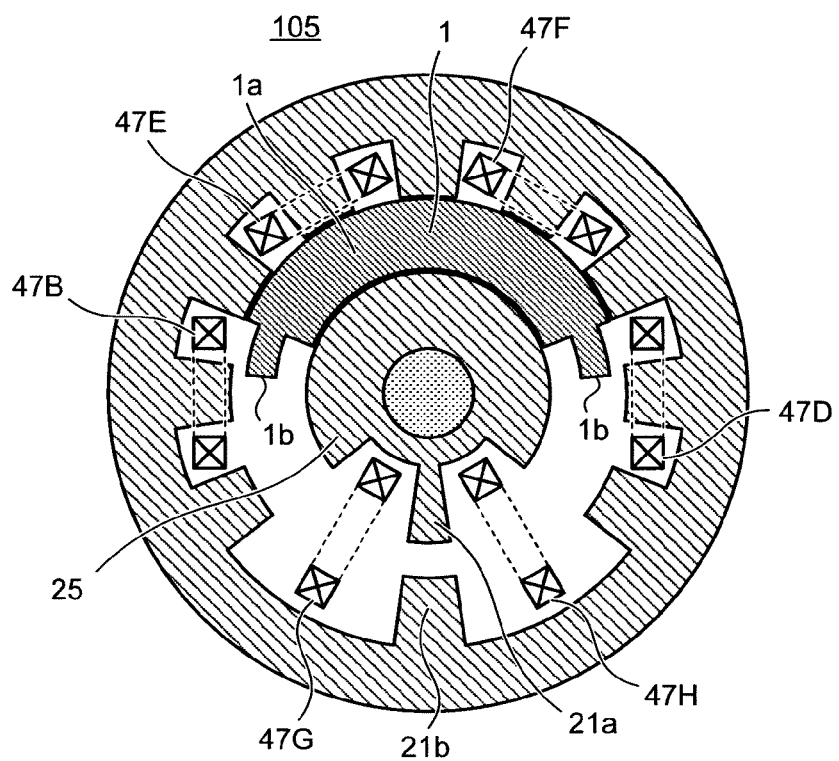
FIG. 21 is a cross-sectional view of a three-stable oscillating electromagnetic actuator according to a fifth embodiment of the present invention.
Figure 22:
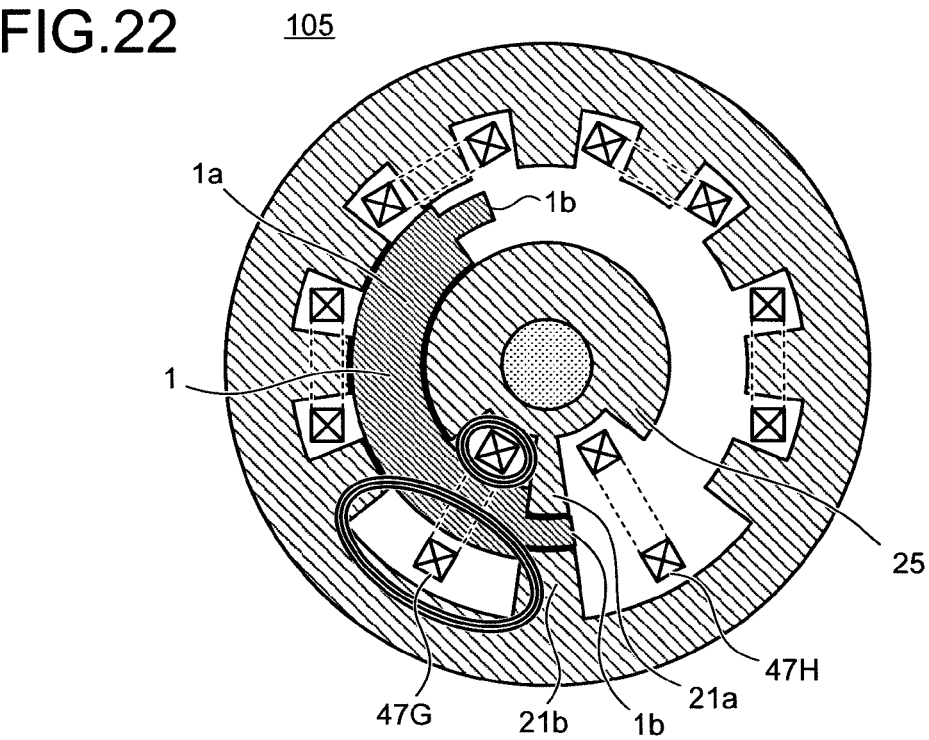
FIG. 22 is a cross-sectional view of a state where magnetic fluxes are generated at a later stage of a driving operation from a neutral position to a first stable position.

FIG. 21 is a cross-sectional view of a three-stable oscillating electromagnetic actuator according to a fifth embodiment of the present invention. FIG. 22 is a cross-sectional view of a state where magnetic fluxes are generated at a later stage of a driving operation from a neutral position to a first stable position. In a three-stable oscillating electromagnetic actuator 105 according to the present embodiment, coils 47G and 47H are wound instead of the coils 47A and 47C according to the first embodiment. When the mover 1 is in the first stable position and the second stable position, the coils 47G and 47H are wound in a direction to surround the mover 1. Coils wound in the direction as that of the coils 47B, 47D, 47E and 47F are called coils (first coils) wound in a tangent direction. Coils wound like the coils 47G and 47H are called coils (second coils) wound in a radial direction. Corresponding to this, recesses for avoiding the coils 47G and 47H are formed on a center member 25 in an inner-diameter direction.

As described above, in the actuator 105 according to the present embodiment, the second coils 47G and 47H respectively arranged in the first stable position and the second stable position to surround the mover 1 are provided in the first stable position and the second stable position, respectively. All of the magnetic fluxes generated by the coil 47G pass through the mover 1 in the tangent direction as shown in FIG. 22. The coil 47H provided in the second stable position is also similar to this. With this arrangement, in the actuator 105 according to the present embodiment, a greater rotation driving force can be effectively obtained as compared with that of the first embodiment.

Sixth Embodiment

Figure 23:
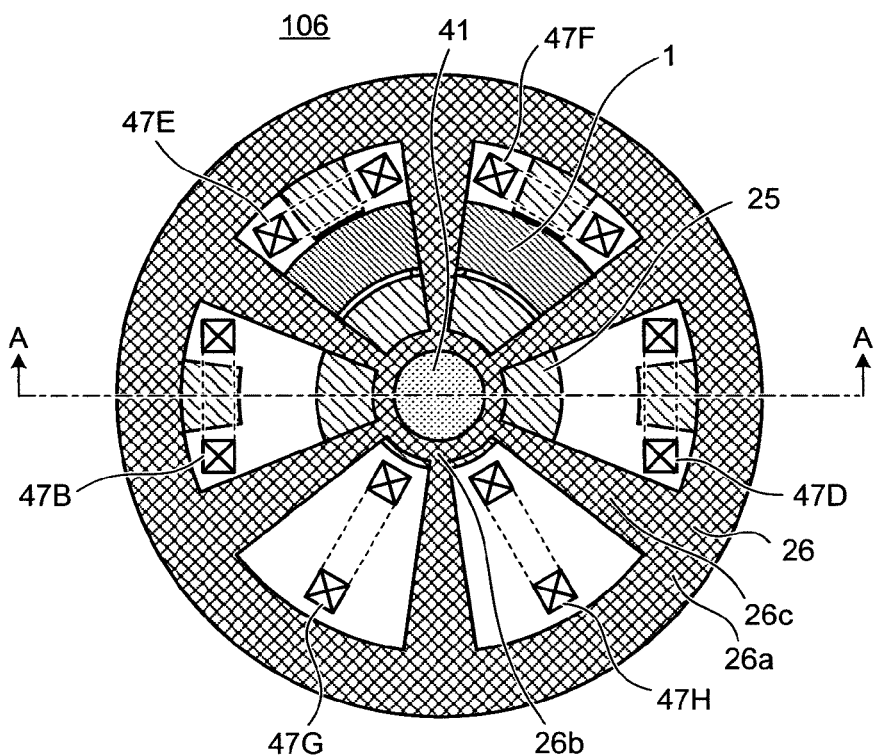
FIG. 23 is a cross-sectional view of a three-stable oscillating electromagnetic actuator according to a sixth embodiment of the present invention.
Figure 24:
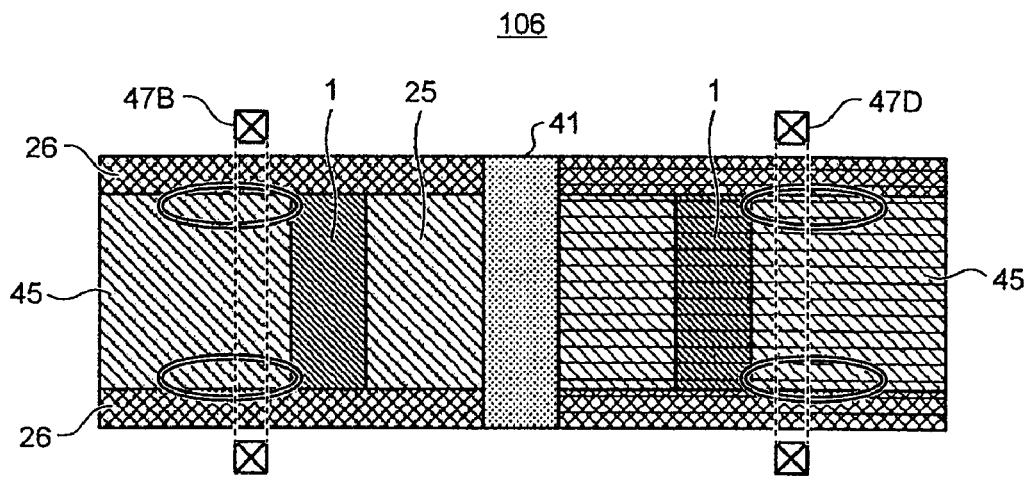
FIG. 24 is an arrow cross-sectional view taken along a line A-A in FIG. 23.

FIG. 23 is a cross-sectional view of a three-stable oscillating electromagnetic actuator according to a sixth embodiment of the present invention. FIG. 24 is an arrow cross-sectional view taken along a line A-A in FIG. 23. The left side of FIG. 24 depicts a state where magnetic fluxes are generated. The right side of FIG. 24 depicts a laminated structure of a stator 45. By forming the stator 45 as a laminated structure, it is possible to interrupt an eddy current.

In FIG. 23, electromagnetic forces caused by the coils 47A, 47D, 47E, and 47F start increasing from frontward of the coils in a rotation direction of the mover 1, and when the mover has passed the coils, the electromagnetic forces are weakened. Therefore, in a three-stable oscillating electromagnetic actuator 106 according to the present embodiment, magnetic materials 26 are superposed on both surfaces of the stator 45 in a direction of the rotation shaft (a direction in which the rotation shaft 41 extends). Each of the magnetic materials 26 includes a large-diameter portion 26a that is superposed on a yoke of the stator 45, a small-diameter portion 26b that surrounds the rotation shaft 41, and radial portions 26c extending from the small-diameter portion 26b to the large-diameter portion 26a. The radial portions 26c are superposed on the magnetic poles between the coils in a laminated direction (the same as the direction of the rotation shaft). That is, the radial portions 26c of the magnetic material 26 are arranged on both ends of the magnetic poles between the coils in the direction of the rotation shaft. With this arrangement, a magnetic flux passes also in the laminated direction in the present embodiment as compared with a conventional technique in which a magnetic flux passes only one side in the radial direction of an end of the mover 1 in the rotation direction. Therefore, the electromagnetic force can be increased in a region where the electromagnetic force tends to be reduced.

Seventh Embodiment

Figure 25:
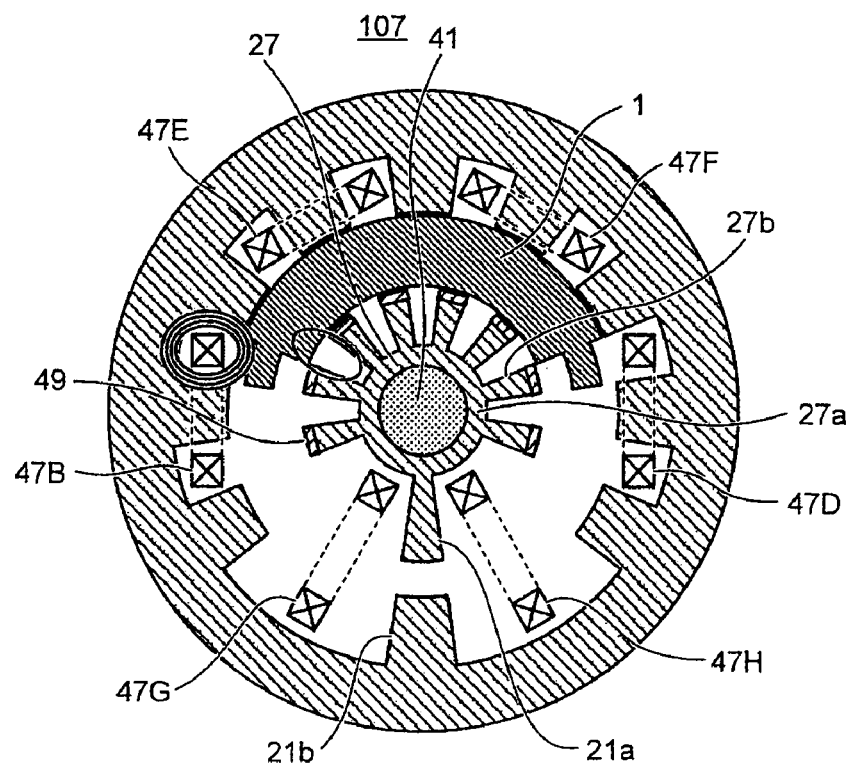
FIG. 25 is a cross-sectional view of a state where magnetic fluxes are generated at an initial stage of a driving operation from a neutral position to a first stable position, in a three-stable oscillating electromagnetic actuator according to a seventh embodiment of the present invention.

FIG. 25 is a cross-sectional view of a three-stable oscillating electromagnetic actuator according to a seventh embodiment, and is a cross-sectional view of a state where magnetic fluxes are generated at an initial stage of a driving operation from a neutral position to a first stable position. As shown in FIG. 25, in a three-stable oscillating electromagnetic actuator 107 according to the present embodiment, a center member 27 includes a cylindrical portion 27a arranged around the rotation shaft 41, and a plurality of projections 27b projecting radially from an outer peripheral surface of the cylindrical portion 27a. Permanent magnets 49 are arranged on tops of the projections 27b to be opposed to the mover 1. That is, the plural permanent magnets 49 are arranged to be opposed to the mover 1 along a moving direction of the mover 1 on an inner-diameter side of the mover 1. The permanent magnets 49 assist a driving force of the mover 1. Other configurations of the seventh embodiment are the same as those of the fifth embodiment.

As also described in the sixth embodiment, only a magnetic flux that passes through one side in a radial direction of the mover 1 contributes to the driving operation. Therefore, in the present embodiment, the permanent magnets 49 are arranged on inner sides of the mover 1 and a magnetic flux passes through also one side on the inner side of the mover 1 and with this arrangement, an electromagnetic force can be increased. The permanent magnets 49 are arranged such that a north pole and a south pole are alternately located.

Figure 26:
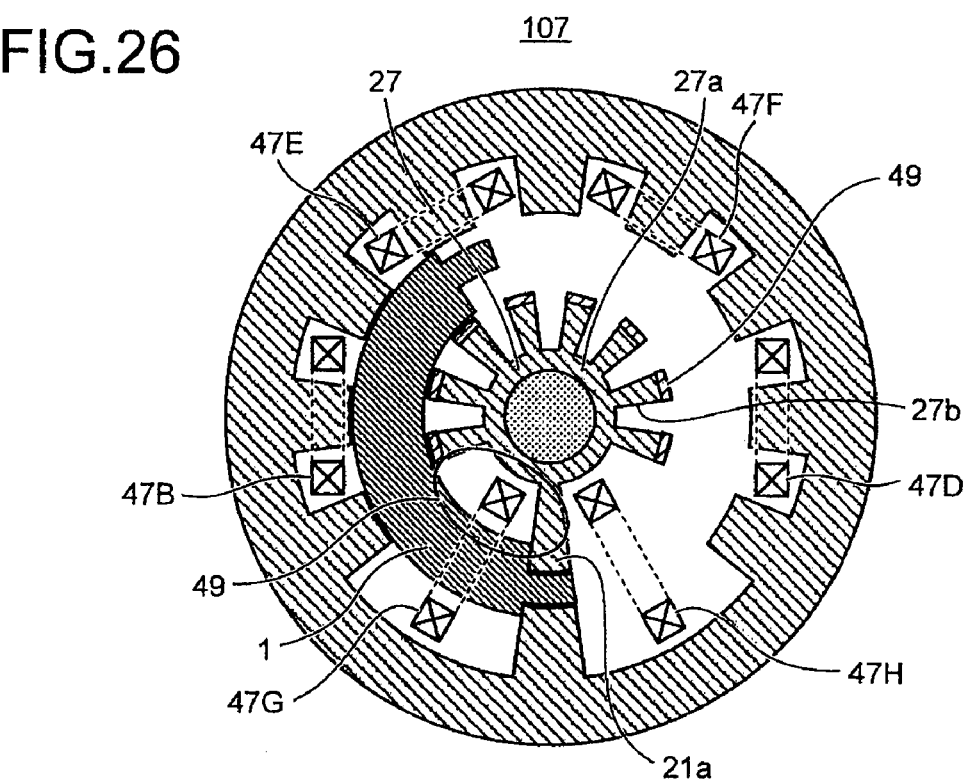
FIG. 26 is also a cross-sectional view of a state where magnetic fluxes are generated at a later stage of a driving operation from the neutral position to the first stable position.

FIG. 26 is a cross-sectional view of a magnetic flux generated at a later stage of the driving operation from the neutral position to the first stable position. A magnetic flux generated from the permanent magnets 49 passes through the mover 1 and passes through the stopper 21a forming the second magnetic pole. With this arrangement, an electromagnetic force is applied between the mover 1 and the stopper 21a, and a retention force can be applied when a coil current is interrupted.

Eighth Embodiment

Figure 27:
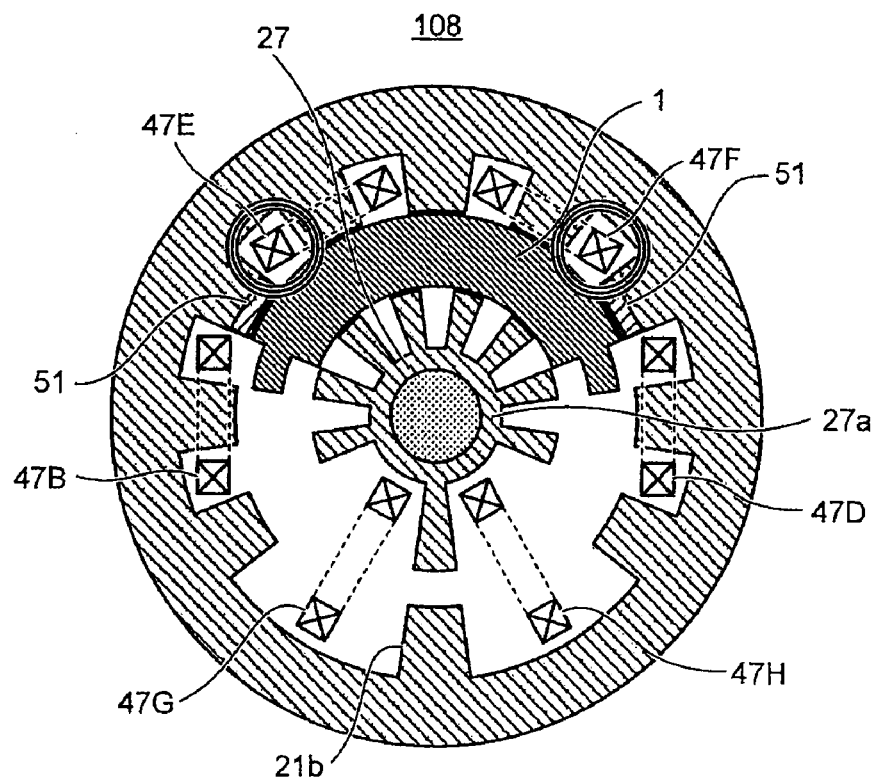
FIG. 27 is a cross-sectional view of a state where magnetic fluxes are generated in second permanent magnets in a neutral position, in a three-stable oscillating electromagnetic actuator according to an eighth embodiment of the present invention.
Figure 28:
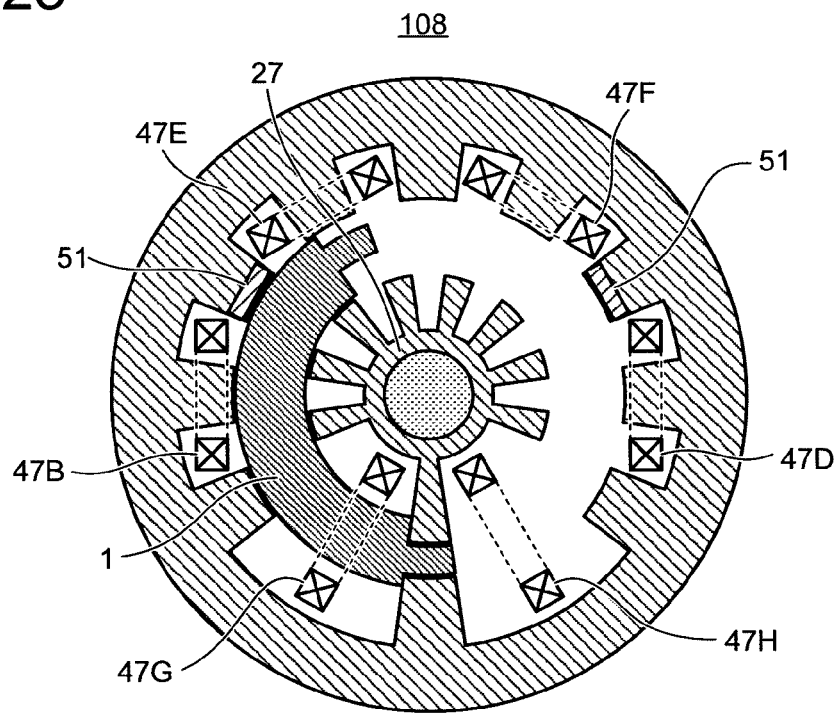
FIG. 28 is a cross-sectional view of a state where a mover that stabilizes in a first stable position.

FIG. 27 is a cross-sectional view of a three-stable oscillating electromagnetic actuator according to an eighth embodiment of the present invention, and is a cross-sectional view of a state where magnetic fluxes are generated in second permanent magnets at a neutral position. FIG. 28 is a cross-sectional view of a state where a mover stabilizes in a first stable position. In FIG. 27, in a three-stable oscillating electromagnetic actuator 108 according to the present embodiment, second permanent magnets 51 and 51 are provided on both ends of the mover 1 in the neutral position in a circumferential direction. The second permanent magnets 51 and 51 assist the mover 1 to stably stop in the neutral position. One of the second permanent magnets 51 is a north pole and the other one is a south pole. Other configurations of the eighth embodiment are the same as those of the fifth embodiment.

In the three-stable oscillating electromagnetic actuator 108 according to the present embodiment, a magnetic flux generated from one of the permanent magnets 51 passes through the mover 1 and is supplied to the other permanent magnet 51. By forming such a magnetic path, even when a current application to the coil is stopped, the mover 1 is stabilized in the neutral position by the effect of the permanent magnets 51 and 51. An energizing direction through the coils 47E and 47F is the same as that through the permanent magnets 51 and 51.

Ninth Embodiment

Figure 29:
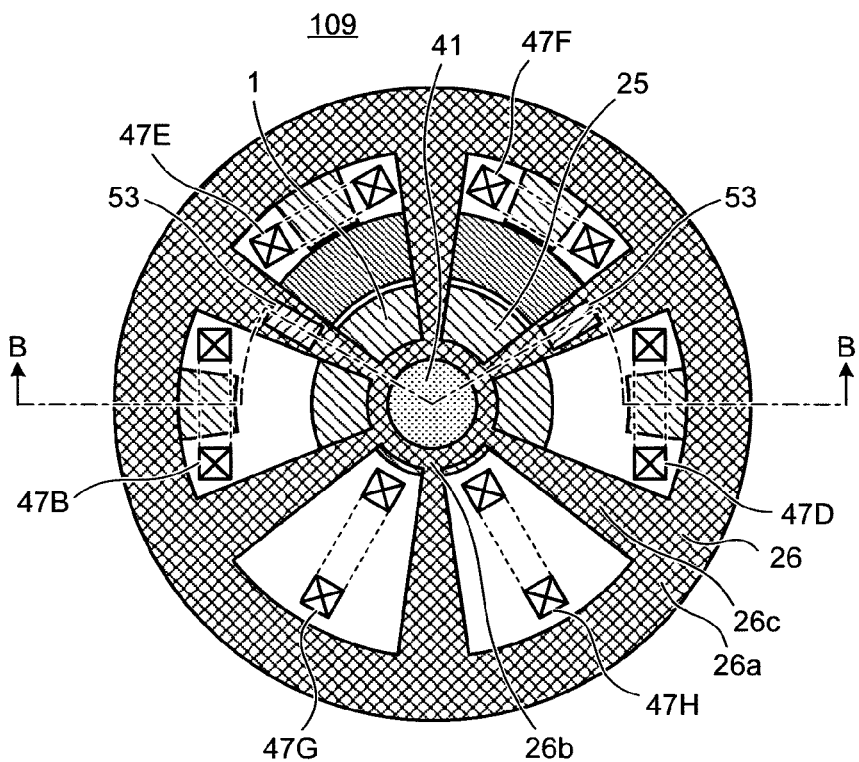
FIG. 29 is a cross-sectional view of a three-stable oscillating electromagnetic actuator according to a ninth embodiment of the present invention.
Figure 30:
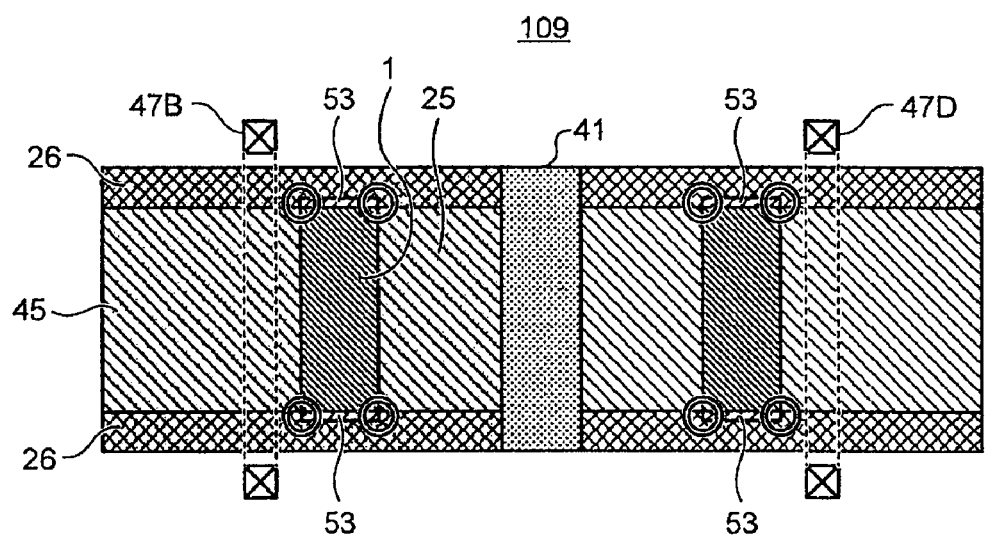
FIG. 30 is an arrow cross-sectional view taken along a line B-B in FIG. 29.

FIG. 29 is a cross-sectional view of a three-stable oscillating electromagnetic actuator according to a ninth embodiment of the present invention. FIG. 30 is an arrow cross-sectional view taken along a line B-B in FIG. 29. In FIG. 29, in a three-stable oscillating electromagnetic actuator 109 according to the present embodiment, second permanent magnets 53 and 53 are embedded in the magnetic material 26 of both ends of the mover 1 in a neutral position in a circumferential direction. The second permanent magnets 53 and 53 assist the mover 1 to stably stop in a neutral position. One of the second permanent magnets 53 is a north pole and the other one is a south pole. Other configurations of the ninth embodiment are the same as those of the sixth embodiment.

In the three-stable oscillating electromagnetic actuator 109 according to the present embodiment, a magnetic flux generated from one of the permanent magnets 53 passes through the mover 1 and is supplied to the other permanent magnet 53. By forming such a magnetic path, even when a current application to the coil is stopped, the mover 1 is stabilized in the neutral position by the effect of the permanent magnets 53 and 53. An energizing direction through the coils 47E and 47F is the same as that through the permanent magnets 53 and 53.

Tenth Embodiment

Figure 31:
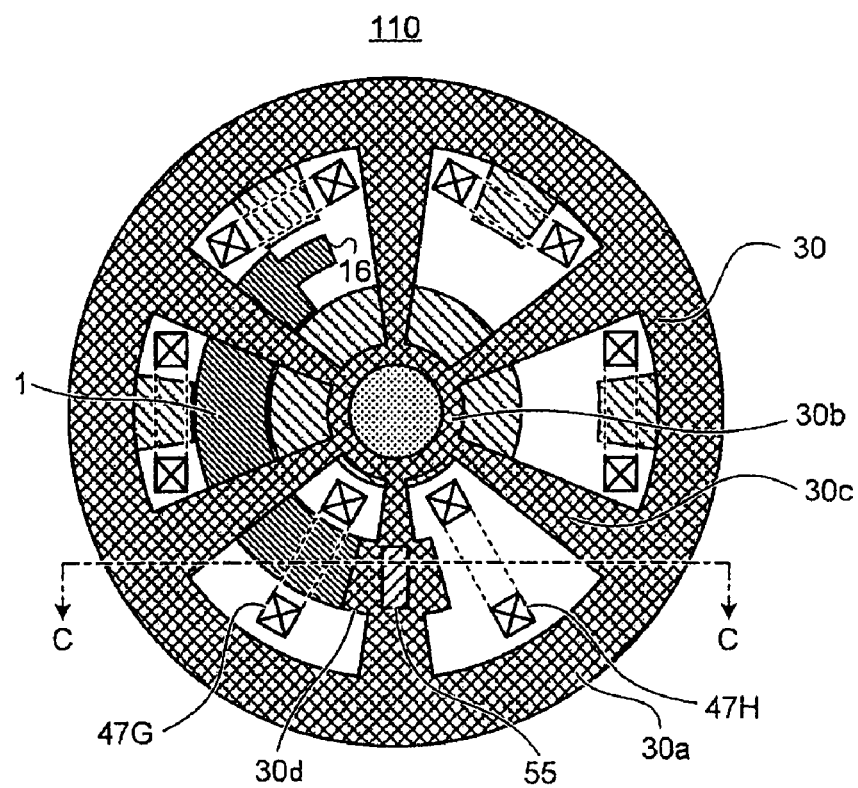
FIG. 31 is a cross-sectional view of a three-stable oscillating electromagnetic actuator according to a tenth embodiment of the present invention.
Figure 32:
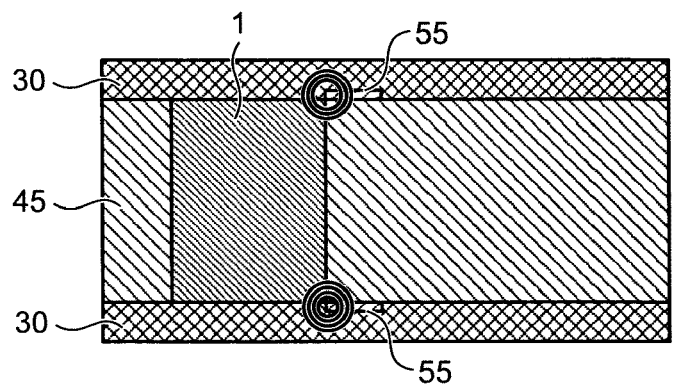
FIG. 32 is an arrow cross-sectional view taken along a line C-C in FIG. 31.

FIG. 31 is a cross-sectional view of a three-stable oscillating electromagnetic actuator according to a tenth embodiment of the present invention. FIG. 32 is an arrow cross-sectional view taken along a line C-C in FIG. 31. As shown in FIG. 31, in a three-stable oscillating electromagnetic actuator 110 according to the present embodiment, magnetic materials 30 are superposed on both surfaces of the stator 45 in a direction of a rotation shaft (an extending direction of the rotation shaft 41). Third permanent magnets 55 are provided on radial portions 30c at locations superposed on the stoppers of the magnetic materials 30.

Each of the magnetic materials 30 includes a large-diameter portion 30a that is superposed on a yoke of the stator 45, a small-diameter portion 30b that surrounds the rotation shaft 41, and the radial portions 30c extending from the small-diameter portion 30b to the large-diameter portion 30a. One of the plural radial portions 30c that is superposed on the stopper is provided with a portion 30d having a large area. The third permanent magnet 55 is embedded in each of the portions 30d having the large area. That is, in the present embodiment, the third permanent magnets 55 are provided on both ends of the stopper in the direction of the rotation shaft. A magnetic flux generated from the permanent magnet 55 passes through an abutment surface of the mover 1. With this arrangement, an electromagnetic force is applied between the mover 1 and the stopper 21a, and the mover 1 is stably held in a first stable position. This is also similar in a second stable position.

Eleventh Embodiment

Figure 33:
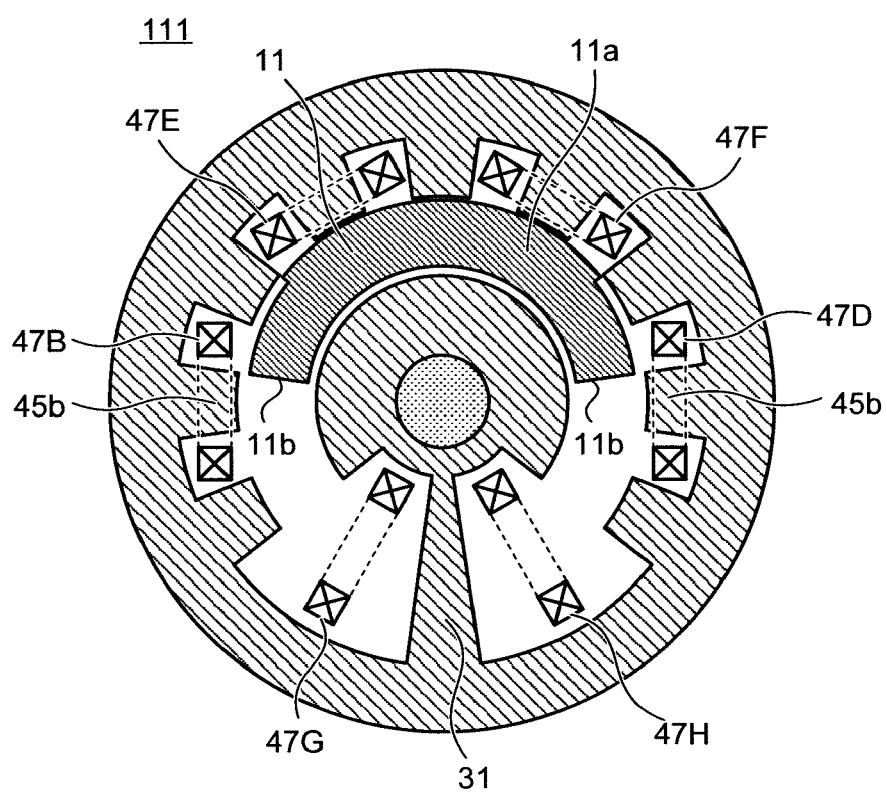
FIG. 33 is a cross-sectional view of a state where a mover of a three-stable oscillating electromagnetic actuator according to an eleventh embodiment of the present invention is stabilized in a neutral position.
Figure 34:
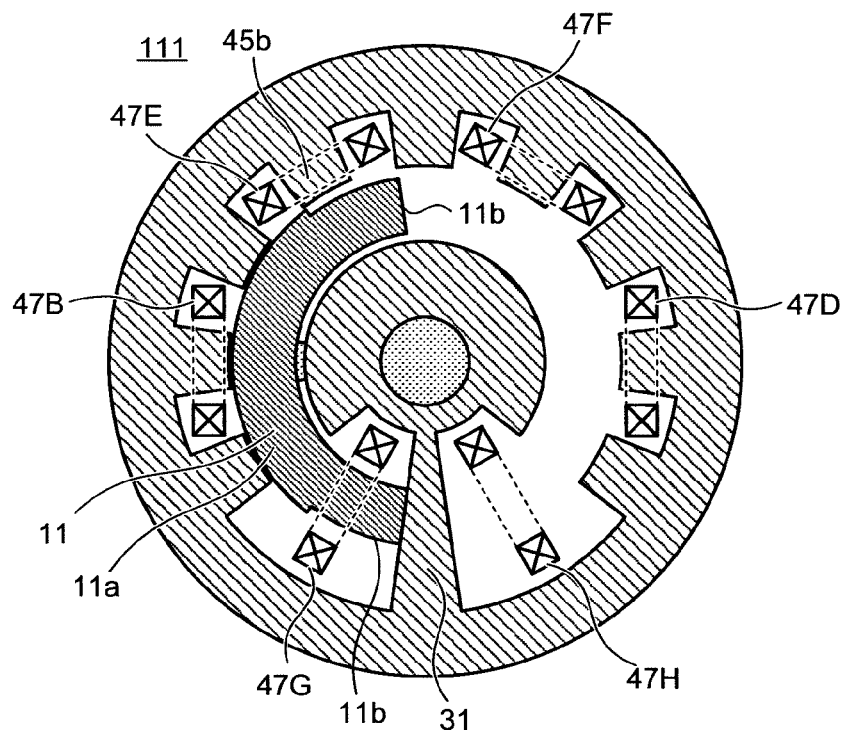
FIG. 34 is a cross-sectional view of a state where the mover of the three-stable oscillating electromagnetic actuator according to the eleventh embodiment of the present invention is stabilized in a first stable position.

FIG. 33 is a cross-sectional view of a state where a mover of a three-stable oscillating electromagnetic actuator according to an eleventh embodiment of the present invention is stabilized in a neutral position. FIG. 34 is a cross-sectional view of a state where a mover of the three-stable oscillating electromagnetic actuator according to the eleventh embodiment of the present invention is stabilized in a first stable position. In a three-stable oscillating electromagnetic actuator 111 according to the present embodiment, a length of a mover 11 in its circumferential direction is long, and a rotation angle from the neutral position to the first stable position and a second stable position is set to be 90°. Other configurations of the eleventh embodiment are the same as those of the fifth embodiment.

In FIG. 33, end surfaces of engaging convex portions 11b that operate as a magnetic pole contributing to the generation of an electromagnetic force at an initial stage of a driving operation from the neutral position to the first stable position and an end surface of the magnetic poles 45b in a circumferential direction with which the coil 47B is energized match each other, so that these end surfaces are located on the predetermined same plane extending in a radial direction. In FIG. 34, a step between the engaging convex portions 11b and a main unit 11a that operates as a magnetic pole contributing to the generation of an electromagnetic force at the initial stage of the driving operation from the first stable position to the neutral position is located on the predetermined same plane extending in the radial direction with respect to an end surface of the magnetic pole 45b in the circumferential direction with which the coil 47E is energized. The concept of forming this magnetic pole is the same in all of the embodiments.

Twelfth Embodiment

Figure 35:
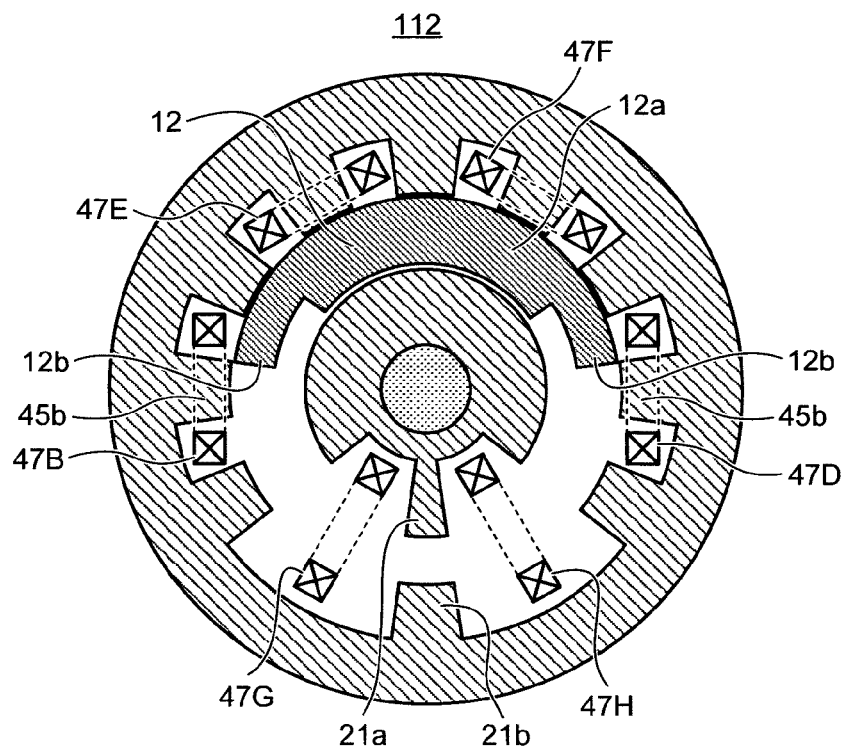
FIG. 35 is a cross-sectional view of a state where a mover of a three-stable oscillating electromagnetic actuator according to a twelfth embodiment of the present invention is stabilized in a neutral position.
Figure 36:
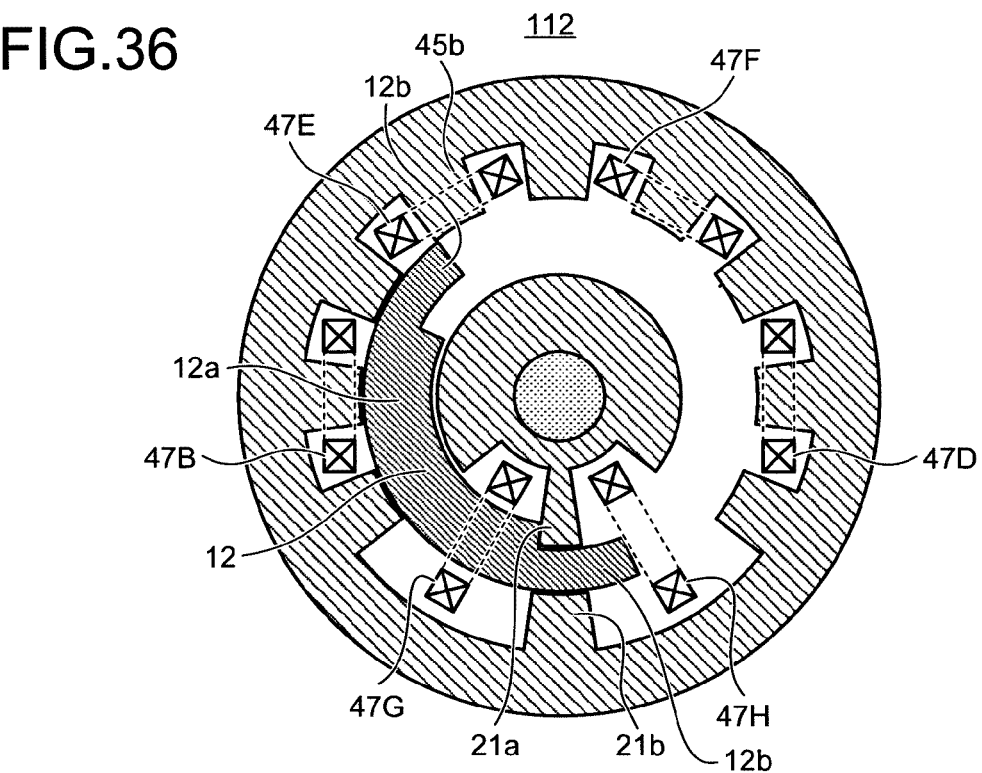
FIG. 36 is a cross-sectional view of a state where the mover of the three-stable oscillating electromagnetic actuator according to the twelfth embodiment of the present invention is stabilized in a first stable position.

FIG. 35 is a cross-sectional view of a state where a mover of a three-stable oscillating electromagnetic actuator according to a twelfth embodiment of the present invention is stabilized in a neutral position. FIG. 36 is a cross-sectional view of a state where a mover of the three-stable oscillating electromagnetic actuator according to the twelfth embodiment of the present invention is stabilized in a first stable position. In a three-stable oscillating electromagnetic actuator 112 according to the present embodiment, a length of a mover 12 in its circumferential direction is short, and a rotation angle from the neutral position to the first stable position and a second stable position is set to be 120°. Other configurations of the twelfth embodiment are the same as those of the fifth embodiment.

In FIG. 35, end surfaces of engaging convex portions 12b that operate as a magnetic pole contributing to the generation of an electromagnetic force at an initial stage of a driving operation from the neutral position to the first stable position and an end surface of the magnetic poles 45b in a circumferential direction with which the coil 47B is energized match each other, so that these end surfaces are located on the predetermined same plane extending in a radial direction. In FIG. 36, the end surfaces of the engaging convex portions 12b that operates as a magnetic pole contributing to the generation of the electromagnetic force at the initial stage of the driving operation from the first stable position to the neutral position is located on the predetermined same plane extending in the radial direction with respect to an end surface of the magnetic poles 45b in the circumferential direction with which the coil 47E is energized.

Thirteenth Embodiment

Figure 37:
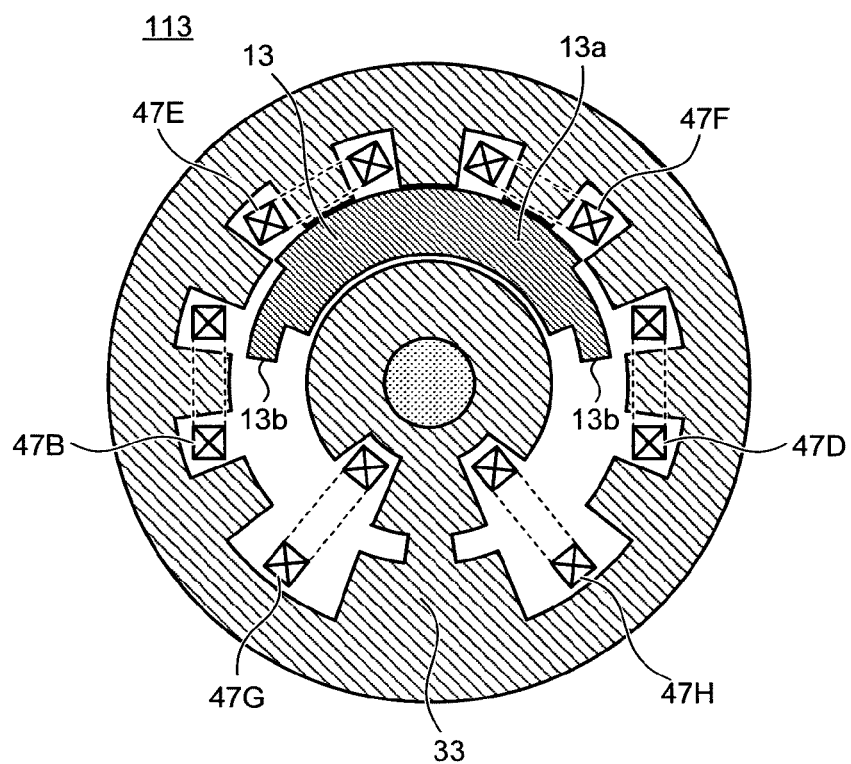
FIG. 37 is a cross-sectional view of a state where a mover of a three-stable oscillating electromagnetic actuator according to a thirteenth embodiment of the present invention is stabilized in a neutral position.
Figure 38:
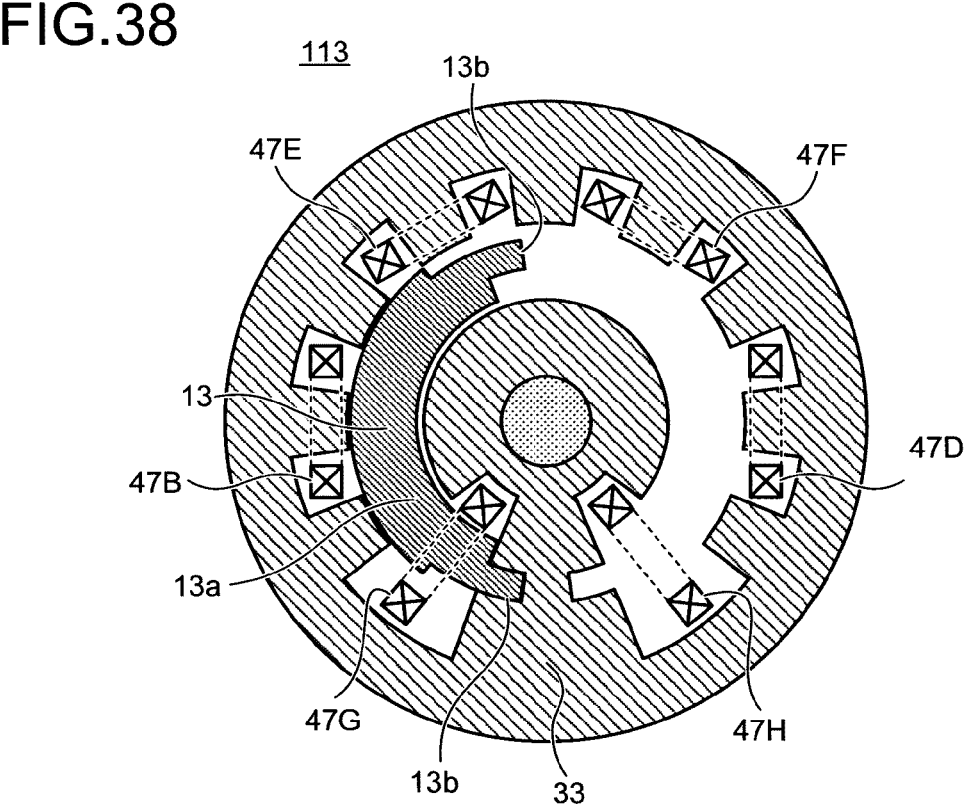
FIG. 38 is a cross-sectional view of a state where the mover of the three-stable oscillating electromagnetic actuator according to the thirteenth embodiment of the present invention is stabilized in a first stable position.

FIG. 37 is a cross-sectional view of a state where a mover of a three-stable oscillating electromagnetic actuator according a thirteenth embodiment of the present invention is stabilized in a neutral position. FIG. 38 is a cross-sectional view of a state where the mover of the three-stable oscillating electromagnetic actuator according the thirteenth embodiment of the present invention is stabilized in a first stable position. In a three-stable oscillating electromagnetic actuator 113 according to the present embodiment, a thickness in a radial direction of a stopper 33 made of a magnetic material that operates as a second magnetic pole is thick. With this arrangement, a rotation angle of a mover 13 from the neutral position to the first stable position and the second stable position is set to be 90°. Other configurations of the thirteenth embodiment are the same as those of the fifth embodiment.

In FIG. 37, end surfaces of engaging convex portions 13b that operate as magnetic poles contributing to the generation of an electromagnetic force at the initial stage of a driving operation from the neutral position to the first stable position and an end surface of the magnetic poles 45b in a circumferential direction with which the coil 47B is energized match each other, so that these end surfaces are located on the predetermined same plane extending in a radial direction. In FIG. 38, a step on an outer peripheral side between the engaging convex portions 13b and a main unit 13a that operates as a magnetic pole contributing to the generation of an electromagnetic force at the initial stage of the driving operation from the first stable position to the neutral position is located on the predetermined same plane extending in the radial direction with respect to an end surface of the magnetic pole 45b in the circumferential direction with which the coil 47E is energized. The concept of forming this magnetic pole is the same in all of the embodiments.

Fourteenth Embodiment

Figure 39:
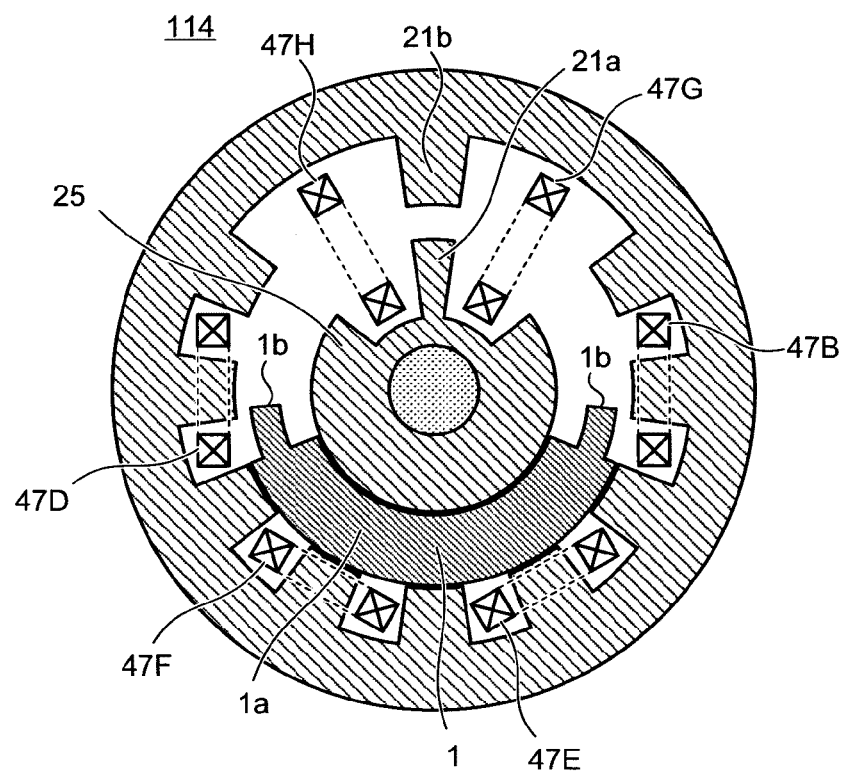
FIG. 39 is a cross-sectional view of a state where a neutral position of a three-stable oscillating electromagnetic actuator according to a fourteenth embodiment of the present invention is located on a lower side in a vertical direction.

FIG. 39 is a cross-sectional view of a state where a neutral position of a three-stable oscillating electromagnetic actuator according to a fourteenth embodiment of the present invention is located on a lower side in a vertical direction. A three-stable oscillating electromagnetic actuator 114 according to the present embodiment is arranged in an installing location such that the neutral position is located on a lower side in a vertical direction. Because the neutral stable position does not have such a structure that the mover physically stops, when the mover 1 stops such that its position is deviated from the center, the mover 1 rotates by its own weight and does not stabilize in the neutral position. Therefore, when the neutral position is located lower, even when the mover stops at a position deviated from the neutral position, the mover 1 stabilized in the neutral position by its own weight. Therefore, even when any electricity cannot be supplied to the coil due to an accident during a driving operation and the mover 1 stops during the driving operation, the mover 1 can stabilize in the neutral position by its own weight.

Fifteenth Embodiment

Figure 40:
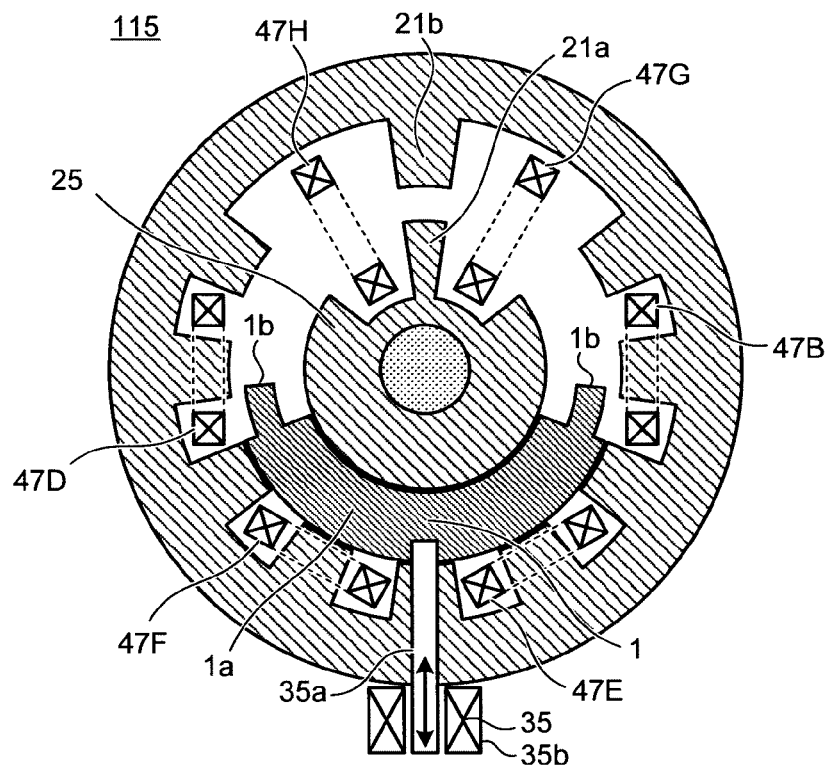
FIG. 40 is a cross-sectional view of a state where a mover of a three-stable oscillating electromagnetic actuator according to a fifteenth embodiment of the present invention is held by a solenoid device in a neutral position.

FIG. 40 is a cross-sectional view of a state where a mover of a three-stable oscillating electromagnetic actuator according to a fifteenth embodiment of the present invention is held by a solenoid device in a neutral position. In FIG. 40, a three-stable oscillating electromagnetic actuator 115 according to the present embodiment further includes a solenoid device 35 having a plunger 35a. The plunger 35a protrudes and retracts in the radial direction and a tip end of the plunger 35a is engaged with a recess provided in the mover 1. The solenoid device 35 provided in the neutral position supplies and blocks a current to a driving coil 35b, so that the plunger 35a protrudes and retracts. The recess is provided in the mover 1 and the tip end of the plunger 35a is fitted into the recess.

In the present embodiment, the mover 1 is physically held in the neutral position using the solenoid device 35. When the permanent magnet is arranged like the eighth and ninth embodiments, the mover can be stabilized in the neutral position even when the coil is not energized. However, when vibration is applied from outside due to an earthquake or the like, there is a possibility that the mover comes out from the neutral position. Therefore, in the present embodiment, when the mover 1 is stabilized in the neutral position, the plunger 35a of the solenoid device 35 is inserted into the mover 1 to physically fix the mover 1.

Sixteenth Embodiment

Figure 41:
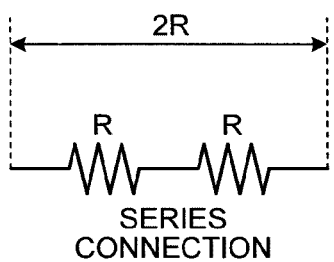
FIG. 41 is a circuit diagram of relevant parts for depicting a connecting method of coils of a three-stable oscillating electromagnetic actuator according to a sixteenth embodiment of the present invention.
Figure 41:
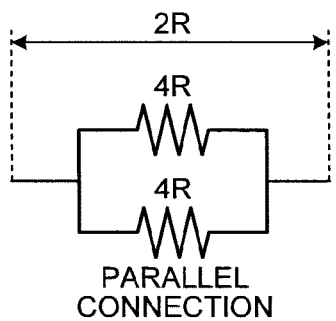

FIG. 41 is a circuit diagram of relevant parts for depicting a connecting method of coils of a three-stable oscillating electromagnetic actuator according to a sixteenth embodiment of the present invention. Adjacent coils 47B and 47G are described here. By connecting the coils 47B and 47G with each other in parallel, a resistance per one coil can be increased. Therefore, a line diameter of the coil can be reduced, and thus the coil can be reduced in weight and its cost reduction can be achieved.

An electric circuit equation when a capacitor is used as the power source is shown below.

$$q(t)/C = I(t)*R + L(x,I)*dI(t)/dt + d\phi(x,I)*dx(t)/dt, dq(t)/dt = I(t)$$

In this equation, q represents an electric charge [C], C represents a capacitance [F], I represents a current [A], R represents a resistance [Ω], L represents a self-inductance [H], x represents a position of a mover [m], and φ represents a magnetic flux [T]. In this equation, a term of a self-inductance in the second term, and a term of an induction electromotive voltage in the third term on a right side are added to the Ohm's equation. In this equation, because the capacitor capacity on a left side and the resistance on the right side are constant, when the self-inductance term and the induction electromotive voltage term are increased, the current can be reduced. When connected in series, the self-inductance becomes an inductance of two coils, but when connected in parallel, the self-inductance becomes equal to an inductance of one coil, and thus the self-inductance term is reduced and the current is increased.

Figure 42:
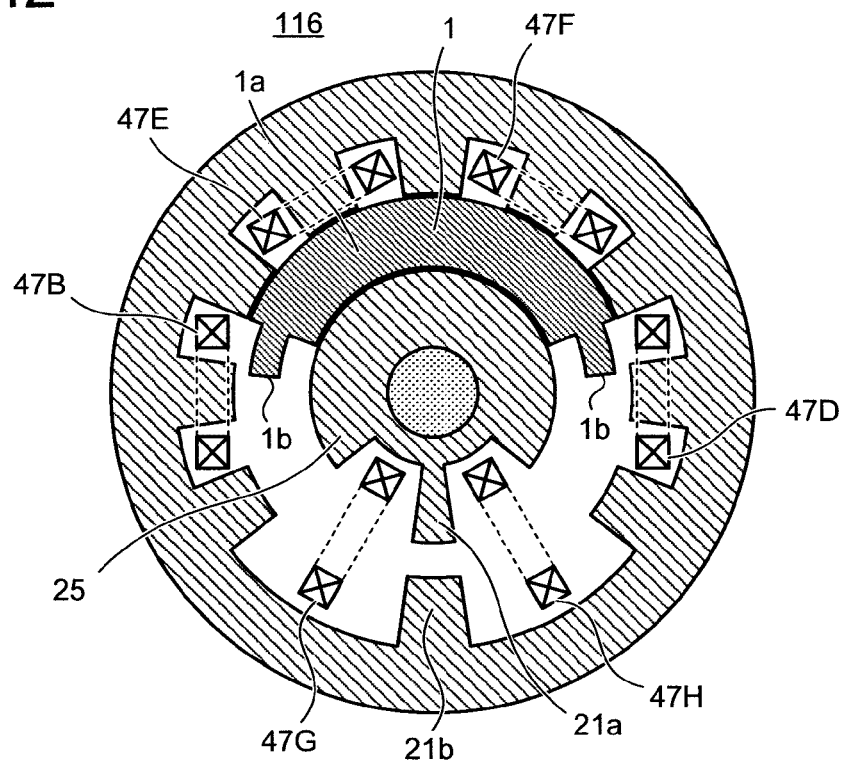
FIG. 42 is a cross-sectional view explaining a term of an induction electromotive voltage depending on a position of a mover, in a state where the mover is in a neutral position.
Figure 43:
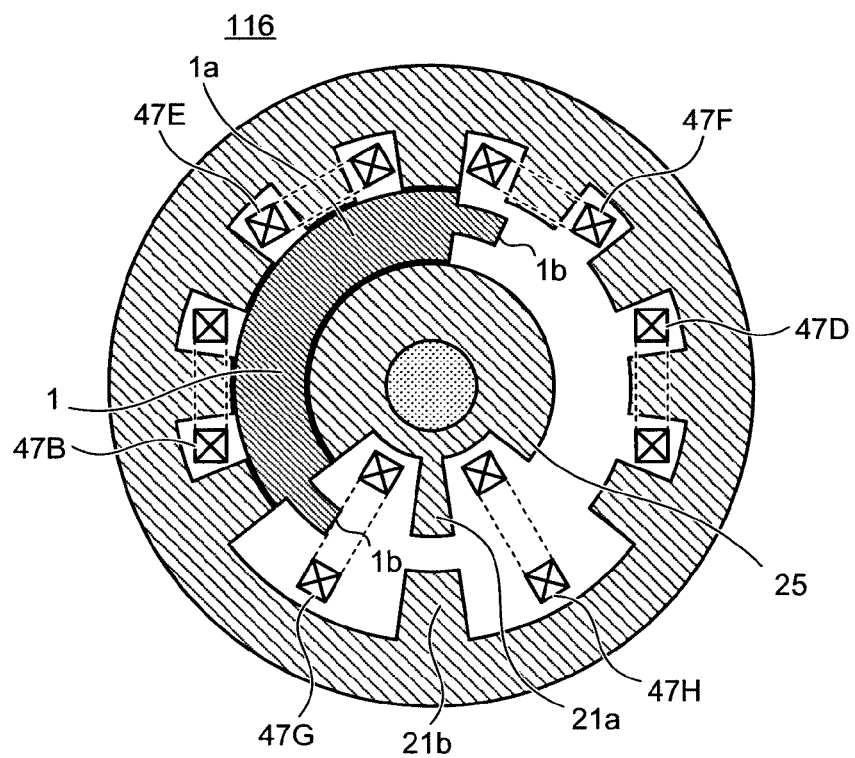
FIG. 43 is also a cross-sectional view explaining the term of the induction electromotive voltage depending on a position of a mover, in a state where the mover is between the neutral position and a first stable position.

A term of the induction electromotive voltage is described next. FIG. 42 is a cross-sectional view explaining the term of the induction electromotive voltage depending on a position of a mover, in a state where the mover is in a neutral position. FIG. 43 is also a cross-sectional view of a state where the mover is between the neutral position and a first stable position. Because the term of the induction electromotive voltage is determined by an amount of the magnetic fluxes, the term of the induction electromotive voltage has been evaluated based on the amount of magnetic fluxes and a current value in respective positions. Because the amounts of magnetic fluxes of the coils 47B and 47G at an initial stage of a driving operation in FIG. 42 are small, the same current values flow through the coils 47B and 47G. Next, in the position shown in FIG. 43, the amount of magnetic fluxes of the coil 47B is large and the amount of magnetic fluxes of the coil 47G is small, and thus the ratio of a current flowing through the coil 47G is increased. Because the coil 47B is used as a driving force at the initial stage of a driving operation, this coil does not contribute to the driving force in the position in FIG. 43, and the coil 47G drives the mover 1. Therefore, any current does not flow through the coil 47B in the position in FIG. 43, and efficiency is higher when more current flows through the coil 47G. Accordingly, when the coils are connected in parallel, the term of the induction electromotive voltage contributes and the current is less likely to flow through the coil 47B at a later stage of the driving operation, and thus it is possible to perform current control such that more current flows through the coil 47G.

Industrial Applicability

As described above, the three-stable oscillating electromagnetic actuator according to the present invention is advantageous when it is applied to an electromagnetic actuator connected to a switch or a disconnecting switch. The three-stable oscillating electromagnetic actuator is optimal when it is applied to an electromagnetic actuator in which a mover stops in three positions in synchronization with an operation of "ON", "OFF", and "ON" of a switch or a disconnecting switch having two stationary contacts and a moving contact.

The invention claimed is:

1. A three-stable oscillating electromagnetic actuator comprising:
a cylindrical stator from which a plurality of first magnetic poles project toward a center direction;
a mover that extends in a circumferential direction inside the stator and is reciprocatingly and rotatably supported along the circumference, the mover having an engaging convex portion formed on a rotation-direction end of the mover, the engaging convex portion projecting in a rotation direction; and
a plurality of coils that are wound around the first magnetic poles and bias the mover to cause it to stop in three positions, which are a first stable position that is on one end side of a rotation range of the mover, a second stable position that is on the other end side, and a neutral third position that is an intermediate position, wherein the three-stable oscillating electromagnetic actuator further comprises a second magnetic pole that is made of a magnetic material and abuts against the rotation-direction end of the mover to stop the mover in the first stable position and the second stable position.

2. The three-stable oscillating electromagnetic actuator according to claim 1, wherein an engaging concave portion that is engaged with the engaging convex portion is formed on the second magnetic pole.

3. The three-stable oscillating electromagnetic actuator according to claim 2, wherein the engaging convex portion is formed at a location shifted toward the coils from a radial-direction center of the end of the mover.

4. The three-stable oscillating electromagnetic actuator according to claim 1, wherein second coils that surround the mover located in the first stable position and the second stable position are provided in the first stable position and the second stable position.

5. The three-stable oscillating electromagnetic actuator according to claim 1, wherein magnetic materials are arranged on both rotation-shaft-direction ends of the first magnetic pole between the coils.

6. The three-stable oscillating electromagnetic actuator according to claim 1, further comprising a permanent magnet that is opposed to the mover along a moving direction of the mover, and that assists a driving force of the mover.

7. The three-stable oscillating electromagnetic actuator according to claim 1, wherein second permanent magnets that assist stabilization of the mover in the neutral position are provided at both circumferential-direction ends of the mover in the neutral position.

8. The three-stable oscillating electromagnetic actuator according to claim 1, wherein second permanent magnets that assist stabilization of the mover in the neutral position are provided on both rotation-shaft-direction ends at both circumferential-direction ends of the mover in the neutral position.

9. The three-stable oscillating electromagnetic actuator according to claim 1, wherein third permanent magnets are provided on both rotation-shaft-direction ends of the stopper.

10. The three-stable oscillating electromagnetic actuator according to claim 1, further comprising a solenoid device having a plunger that protrudes and retracts in a radial direction and has a tip end engaged with a recess provided in the mover.

* * * * *